(12) United States Patent
Dizengof

(10) Patent No.: US 10,853,703 B2
(45) Date of Patent: Dec. 1, 2020

(54) SYSTEMS AND METHODS FOR INTERFACING BETWEEN SOFTWARE COMPONENTS

(71) Applicant: Carbyne Ltd., Tel-Aviv (IL)

(72) Inventor: Alexander Dizengof, Ashdod (IL)

(73) Assignee: Carbyne Ltd., Tel-Aviv (IL)

( * ) Notice: Subject to any disclaimer, the term of this patent is extended or adjusted under 35 U.S.C. 154(b) by 0 days.

(21) Appl. No.: 16/000,932

(22) Filed: Jun. 6, 2018

(65) Prior Publication Data

US 2019/0377989 A1 Dec. 12, 2019

(51) Int. Cl.
  G06K 15/00 (2006.01)
  G06K 9/62 (2006.01)
  G06F 9/448 (2018.01)
  G06F 9/451 (2018.01)
  G06F 9/54 (2006.01)
  G10L 15/08 (2006.01)

(52) U.S. Cl.
  CPC .......... *G06K 9/6288* (2013.01); *G06F 9/448* (2018.02); *G06F 9/451* (2018.02); *G06F 9/54* (2013.01); *G10L 15/08* (2013.01); *G06K 2209/01* (2013.01)

(58) Field of Classification Search
  CPC .. G06K 9/6288; G06K 2209/01; G06F 9/448; G06F 9/451; G06F 9/54; G10L 15/08
  See application file for complete search history.

(56) References Cited

U.S. PATENT DOCUMENTS

| 2007/0255811 | A1* | 11/2007 | Pettit | G06F 17/30905 709/220 |
| 2008/0086700 | A1 | 4/2008 | Rodriguez et al. | |
| 2014/0370841 | A1* | 12/2014 | Roberts | H04M 1/72536 455/404.2 |
| 2015/0026574 | A1* | 1/2015 | Dow | G06F 13/385 715/719 |
| 2015/0127628 | A1* | 5/2015 | Rathod | H04W 4/21 707/710 |

(Continued)

FOREIGN PATENT DOCUMENTS

WO   WO 2019/234729   12/2019

OTHER PUBLICATIONS

Ryan Kilgore et al "A Precision Information Environment (PIE) for Emergency Responders", p. 766-771, 2013 IEEE (Year: 2013).*

(Continued)

*Primary Examiner* — Doon Y Chow
*Assistant Examiner* — Abdou K Seye

(57) ABSTRACT

There is provided a computer implemented method for automatically updating an application programming interface (API) according to a user interface (UI), comprising: providing a UI presented on a display of a computing device, analyzing the visual presentation of the UI on the display to identify at least one key-value pair, defining a dynamic data stream based on the at least one key-value pair, providing the dynamic data stream to an API for access by client code, monitoring the UI presented on the display to detect dynamic updates of the at least one key-value pair, and dynamically updating each respective value of each of the at least one key-value pair of the dynamic data stream of the API according to the detected dynamic updates.

29 Claims, 11 Drawing Sheets

(56) References Cited

U.S. PATENT DOCUMENTS

| | | | | |
|---|---|---|---|---|
| 2015/0137972 A1* | 5/2015 | Nepo | ................... | G08B 25/001 |
| | | | | 340/539.13 |
| 2016/0337831 A1* | 11/2016 | Piett | ....................... | H04W 4/90 |
| 2016/0278297 A1 | 12/2016 | Velan et al. | | |
| 2018/0054713 A1* | 2/2018 | South | ..................... | H04W 4/33 |

OTHER PUBLICATIONS

Mohammad Osiur Rahman et al. ("Real Time Road Sign Recognition System Using Artificial Neural Networks for Bengali Textual Information Box", 2008 IEEE, pp. 1-8 (Year: 2008).*
International Search Report and the Written Opinion dated Aug. 14, 2019 From the International Searching Authority Re. Application No. PCT/IL2019/050598. (14 Pages).

\* cited by examiner

SYSTEMS AND METHODS FOR INTERFACING BETWEEN SOFTWARE COMPONENTS

FIELD AND BACKGROUND

The present invention, in some embodiments thereof, relates to software interfaces and, more specifically, but not exclusively, to systems and methods for interfacing between software components.

Different software components, for example, applications, web-based systems, and operating systems, interact with each other via defined software interfaces, for example, one or more application programming interfaces (API). API represent defined methods for communication between the different software components. Examples of APIs include: routines, data structures, object classes, variables, and remote calls.

SUMMARY OF THE INVENTION

According to a first aspect, a computer implemented method for automatically updating an application programming interface (API) according to a user interface (UI), comprises: providing a UI presented on a display of a computing device, analyzing the visual presentation of the UI on the display to identify at least one key-value pair, defining a dynamic data stream based on the at least one key-value pair, providing the dynamic data stream to an API for access by client code, monitoring the UI presented on the display to detect dynamic updates of the at least one key-value pair, and
dynamically updating each respective value of each of the at least one key-value pair of the dynamic data stream of the API according to the detected dynamic updates.

According to a second aspect, a computer implemented method for automatically updating an API according to a UI, comprises: providing a UI presented on a display of a computing device, analyzing at least one of the structure and layout of the UI to identify at least one key-value pair, defining a dynamic data stream based on the at least one key-value pair, providing the dynamic data stream to an API for access by client code, monitoring the UI presented on the display to detect dynamic updates of the at least one key-value pair, and dynamically updating each respective value of each of the at least one key-value pair of the dynamic data stream of the API according to the detected dynamic updates.

According to a third aspect, a computer implemented method for automatically updating an API according to a UI, comprises: providing a UI presented on a display of a computing device, providing a mechanism for a user to manually mark at least one region of the UI on the display, analyzing each manually marked at least one region of the UI on the display to identify at least one key-value pair, defining a dynamic data stream based on the at least one key-value pair, providing the dynamic data stream to an API for access by client code, monitoring the UI presented on the display to detect dynamic updates of the at least one key-value pair, and dynamically updating each respective value of each of the at least one key-value pair of the dynamic data stream of the API according to the detected dynamic updates.

According to a fourth aspect, a computer implemented method for dynamically updating a UI, comprises: monitoring at least one dynamic data object associated with a UI presented on a display of a computing device to detect a change to the at least one dynamic data object, dynamically extracting a current value of the at least one dynamic data object in response to the detected change, dynamically providing the current value of the at least one dynamic data object to client code, dynamically computing at least one client data object by the client code based on the current value of the at least one dynamic data object value, and dynamically injecting the at least one client data object into the UI presented on the display of the computing device.

In a further implementation form of the first, second, third aspects, the API includes an object class storing the at least one key-value pair.

In a further implementation form of the first, second, third aspects, the client code and code storing instructions for monitoring the UI and dynamically updating the API are part of a same process, and wherein the API is provided to the client code based on callback function.

In a further implementation form of the first aspect, an API event is generated in response to each detected dynamic update, and a new data object is created according the value of the at least one key-value pair corresponding to the respective detected dynamic update.

In a further implementation form of the first aspect, the UI comprises a graphical user interface (GUI) that includes graphical objects, and wherein analyzing comprises performing an optical character recognition (OCR) process of the GUI to identify the at least one key-value pair.

In a further implementation form of the first aspect, analyzing comprises analyzing a screen capture of the display presenting the UI by performing OCR to identify the at least one key-value pair.

In a further implementation form of the first aspect, the method further comprises monitoring the display on which the UI is presented over a time interval to create a sequences of screen captures, analyzing the sequence of screen captures to identify at least one value that dynamically changes over the time interval, analyzing the sequence of screen captures to identify at least one value that remains static during the time interval, wherein each at least one value that remains static is located in proximity to one of the at least one value that dynamically changes, and designating the at least one key-value pair according to each respective at least one value that remains static and corresponding at least one value that dynamically changes located in proximity to the respective at least one value that remains static.

In a further implementation form of the first and third aspects, the method further comprises marking at least one region of the UI corresponding to each respective key-value pair, and obtaining at least one of a confirmation and an adaption of at least one marked region from a user.

In a further implementation form of the first, second, third aspects, the API includes only the value of the key-value pair, and the key of the key-value pair is not defined or determined by the client code according to an analysis of the value of the key-value pair.

In a further implementation form of the first, second, third aspects, the client code computes at least one data object according to the at least one key-value pair of the API, and further comprising injecting the computed data object into the UI for presentation on the display of the computing device.

In a further implementation form of the first, second, third aspects, the client code dynamically computes at least one data object according to dynamically updates of the value of the at least one key-value pair of the API, and the computed data is dynamically injected into the UI for dynamic updating of the presentation on the display of the computing device.

In a further implementation form of the first, second, third aspects, the value of the at least one key-value pair comprises a phone number of a mobile device, wherein voice data of an analogue telephone call originating from the mobile device is dynamically provided to the API for access by client code, wherein the client code fuses the voice data obtained from the API with a video feed obtained from a video camera of the mobile device to create a fused data feed, wherein the fused data feed is transmitted to a remote computing device.

In a further implementation form of the first, second, third aspects, the value of the at least one key-value pair comprises a phone number, wherein the client code converts an analogue call from a smartphone associated with the phone number into a smart-call, wherein the smart-call comprises at least one multi-media data object, and wherein the at least one multi-media data object is injected into the UI for presentation on the display of the computing device, wherein the presentation of at least one multi-media data object is dynamically updated.

In a further implementation form of the first, second, third aspects, the method further comprises a smart-call GUI presented as an overlay over the UI, wherein the smart-call GUI is presented according to an inactive state when no value is assigned to the at least one key-value pair indicative of no current analogue call, and the smart-call GUI is presented according to an active state that presents at least one multi-media data object.

In a further implementation form of the first, second, third aspects, the smart-call GUI of the inactive state includes at least one activation marking for activation of a corresponding multi-media data object, and the smart-call GUI of the active state includes at least one termination marking for termination of a corresponding multi-media data object, wherein the smart-call GUI dynamically expands in response to additional activated multi-media data objects and contracts in response to termination of existing multi-media data objects.

In a further implementation form of the first, second, third aspects, the at least one multi-media data object is based on a multi-media communication application executing on the smartphone.

In a further implementation form of the first, second, third aspects, the at least one multi-media data object is selected from the group consisting of: a photo captured by a camera of the smartphone, a video streamed from a camera of the smartphone, an image shared by the smartphone, a message sent by a messaging application executed on the smartphone, a geographic location indicating the location of the smartphone, and one way voice transmitted from the smartphone.

In a further implementation form of the first, second, third aspects, the client code and the UI are executed on the same computing device.

In a further implementation form of the second aspect, the analyzing the code comprises: walking a tree representation of the code of the UI to identify at least one smallest text box input object, wherein a value of a certain key-value pair is designated according to a value stored by a certain smallest text box input object, and a key of the certain key-value pair is designated according to the key of the certain smallest text box input object.

In a further implementation form of the third aspect, each region is identified with a single marking act executed by the user via the mechanism.

In a further implementation form of the third aspect, analyzing comprises receiving a manual entry by the user indicative of at least one key, wherein a certain key-value pair is identified by pairing each respective manually entered key with a corresponding value identified with a certain manually entered region, and wherein monitoring comprises monitoring each manually entered region of the UI to detect dynamic updates of each respective value of each respective key-value pair.

In a further implementation form of the third aspect, the mechanism comprises a marking tool for drawing a geometrical shape defining the at least one region as an overlay of the UI.

In a further implementation form of the third aspect, the key-value pair of each respective marked region of the UI is identified by: monitoring the respective marked region over a time interval to identify a dynamic value that dynamically changes over the time interval, receiving a manually entered value, and designating the key of the key-value pair according to the manually entered value and the value of the key-value pair according to the dynamic value.

In a further implementation form of the fourth aspect, the at least one dynamic data object is indicative of an interactive user event of a user interacting with the at least one client data object.

In a further implementation form of the fourth aspect, the at least one dynamic data object comprises streaming voice data of an analogue telephone call originating from a phone and received by the computing device, wherein a phone number of the phone is presented on the UI, wherein the client code executes a natural language processing (NLP) code for analyzing key words identified in the streaming voice data, and wherein the client data object is computed according to the analysis of the key words identified in the streaming voice data.

In a further implementation form of the fourth aspect, the method further comprises analyzing the UI over a time interval to identify at least one static region where the UI remains constant over the time interval, and wherein the at least one client data object is injected into the UI for presentation over the at least one static region.

In a further implementation form of the fourth aspect, in a next iteration, user interactions with the previously injected client data object are monitored to determine whether the previously injected client data object is selected, wherein another client data object is computed according to the user interactions, and wherein the another client data object is currently injected into the UI in response to the user selection of the previously injected client data object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION

Figure 1:
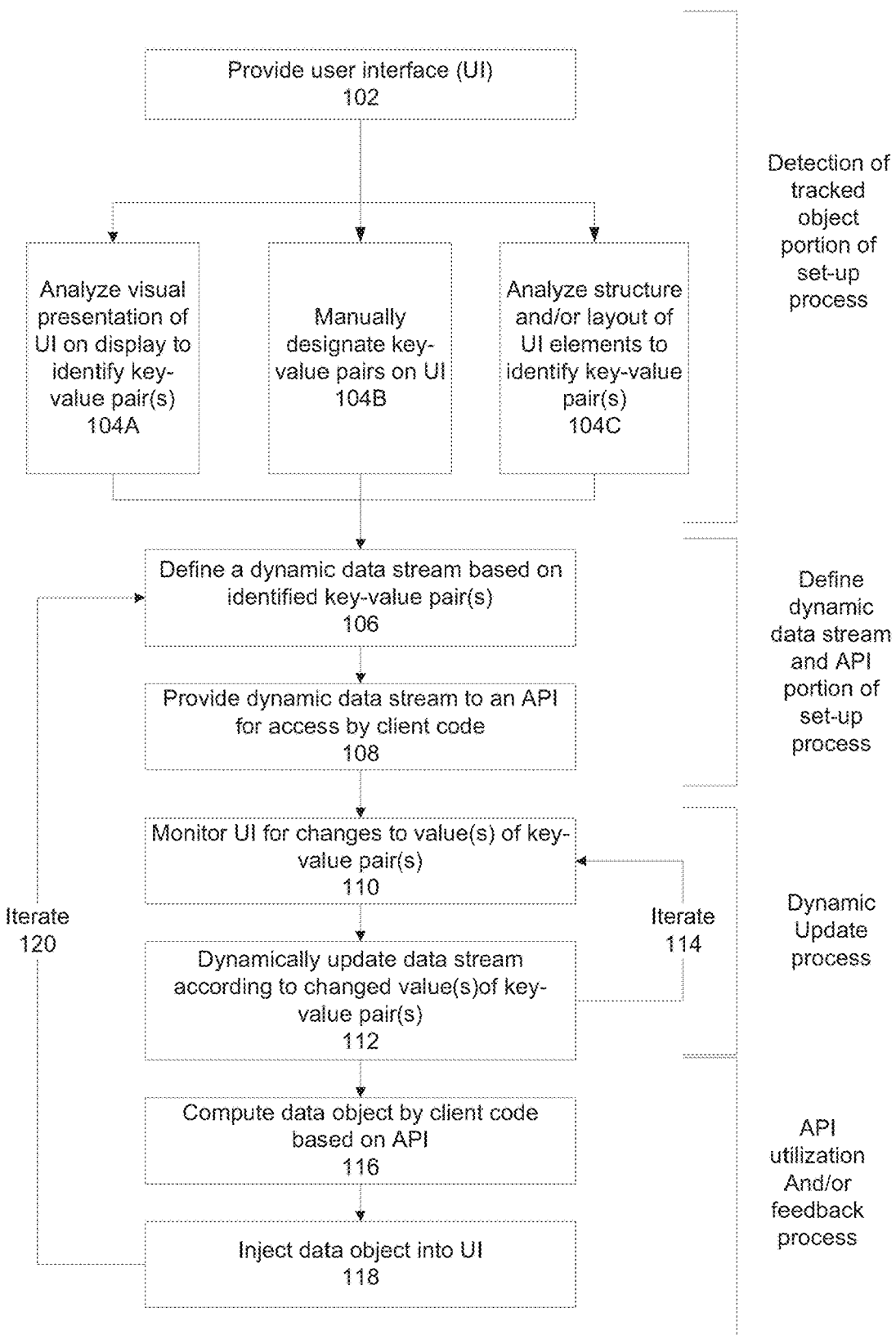
FIG. 1 is a flowchart of a method for automatically updating an API with a dynamic data stream according to dynamic values extracted from a UI, in accordance with some embodiments of the present invention.

The present invention, in some embodiments thereof, relates to software interfaces and, more specifically, but not exclusively, to systems and methods for interfacing between systems.

An aspect of some embodiments of the present invention relates to systems, methods, and/or code instructions (i.e., stored on a data storage device, executable by one or more hardware processors) for updating an application programming interface (API) with a dynamic data stream according to dynamic values extracted from a user interface (UI), optionally a graphical user interface (GUI). The UI, which is presented on a display of a computing device, is analyzed to identify at least one key-value pair. The key-value pair, which is presented within the UI on the display, includes a static key value which remains unchanged over a time interval, and an associated value which dynamically changes over the time interval. For example, the key of the key-value pair is the label "Caller number" presented by the UI, and the value of the key-value pair is the current phone number of the caller presented by the UI in proximity to the label "Caller number". The label "Caller number" remains static, while the actual phone number of the caller presented in proximity to the label "Caller number" varies according to the current caller. A dynamic data stream that includes the identified key-value pair(s) is automatically defined. The data stream is fed into an API is accessible by client code (e.g., another application). The UI presented on the display is monitored for dynamic updates of respective value(s) of the identified key-value pair(s). The respective value(s) of the identified key-value pair(s) of the dynamic data stream of the API are automatically updated in response to the dynamic updates detected by the monitoring of the UI. An event indicative of the update to the data stream of the API may be generated and provided to the client code.

Optionally, the visual presentation of the UI, as presented on the display is analyzed. The key-value pairs may be detected by iteratively executing an optical character recognition (OCR) process on the contents of the screen (e.g., on a screen capture image) over a time interval, and monitoring for changes, for example, detecting characters that change over the time interval. The changing characters are identified as values of respective key-value pairs, and a static label in proximity to each respective identified value is identified as the key of the respective key-value pairs.

Alternatively or additionally, the key-value pair(s) are manually designated by a user, optionally via another marking user interface. A marking tool may be provided to manually designate regions of the UI that include the key-value pair(s). For example, the marking tool is used to draw a rectangle (or other shape) on the UI. The region within the rectangle includes the key-value pair(s).

Alternatively or additionally, the structure of the UI (e.g., code, hierarchical organization of UI elements) is analyzed to identify the key-value pair(s). The structure of the UI may be analyzed by walking a tree representation (e.g., of the code) of the UI to identify the smallest text box input object(s). The value of the respective key-value pair is designated according to the value stored by a respective smallest text box input object. The key of the respective key-value pair is designated according to the key of the respective smallest text box input object.

An aspect of some embodiments of the present invention relates to systems, methods, and/or code instructions (i.e., stored on a data storage device, executable by one or more hardware processors) for dynamically updating a UI presented on a display of a client terminal by injection of client data object(s) computed by client code. The dynamic data object(s) associated with the UI is monitored to detect a change thereof. A current value of the dynamic data object(s) is extracted in response to the detected change. The current value of the dynamic data object(s) is provided to the client code. The client data object(s) is computed based on the current value of dynamic data object(s). The client data object(s) is dynamically injected into the UI presented on the display of the computing device.

At least some implementations of systems, methods, and/or code instructions described herein relate to the technical problem of integrating two or more different code components (also referred to herein as systems), optionally applications, for example, a legacy system with a modern system. In particular, at least some implementations of systems, methods, and/or code instructions described herein relate to the technical problem of interfacing a UI with client code without accessing the code of the UI and/or without interfacing with a third party that administers the UI (e.g., developers of the UI, support team of the UI). The technical problem may relate to providing the client code with dynamic values that are updated in the UI. Integration of such systems may be performed manually, for example, by developers of each system meeting to discuss and manually design software interfaces. Such manual design and development of the software interfaces is time consuming, complex, and prone to errors. Moreover, such manual development of software interfaces may expose the existing systems to risk, such as creation of security breaches and/or introduced errors that arise when the existing system (e.g., the source code of the existing system) is tampered with part of the process of creating the software interface.

As described herein, the technical solutions provided by at least some implementations of systems, methods, and/or code instructions described herein create a stream of dynamic data based on dynamic values identified within the UI. The stream of dynamic data is provided to client code is real time via an API, reflecting real time updates of values presented by the UI. Events may be generated according to updating of the stream of dynamic data of the API.

At least some implementations of systems, methods, and/or code instructions described herein relate to the technical problem of enhancing dynamic data of a legacy system that presents a legacy UI. At least some of the technical solution described herein, which represents an improvement to the technology of GUIs, is based on enhancement of dynamic data, rather than for example, static data of the UI. The legacy UI is transformed into an updated UI, with additional client data objects originating from the client code, without necessarily requiring access to the code of the legacy UI (for adjustment of the code) and/without necessarily requiring interactions with third parties (that administer the legacy UI). For example, in the setting of an emergency call center, legacy data such as analogue voice call data may be fused with smart data outputted by a smartphone where the analogue voice call data originates. For example, a video of the scene captured by a camera of the smartphone is fused with the analogue voice data to create an upgraded data stream, which may be transmitted by the server of the emergency call center to an emergency vehicle travelling to the scene. In another example, the voice calls are analyzed by the client code to identify instances of keywords. The keywords may be presented on the screen, for example, "heart attack", "stabbing attack", and "incoherent speech". At least some of the technical solution described herein, which represents an improvement to the technology of GUIs, is based on monitoring user actions performed on the dynamically injected data, for dynamically adjusting the dynamically injected data. For example, the user may interact with the keywords identified from the call presented on the UI to trigger further actions, for example, click on heart attack to load instructions to read to the caller on how to handle the heart attack.

At least some implementations of systems, methods, and/or code instructions described herein improve the technology of integrating two or more different code components. In particular, at least some implementations of systems, methods, and/or code instructions described herein reduce the time to integrate two or more systems and/or reduce the complexity of integration of the systems, based on the automatically generated API, as described herein. Moreover, the automatically updated API described herein is created for use by the client code without necessarily requiring access to the source code of the UI, and/or without tampering with the UI itself. The UI may be integrated with the client code via the API without involving the UI and/or the vendor of the UI, for example, the API may be created without accessing components of the UI itself (e.g., the source code), and/or without involving development teams of the UI.

For example, a legacy UI may be integrated with client code in a matter of minutes, by simply installing the code that automatically generates the API as described herein. Little or no user intervention is required. Once the code is installed, the code may automatically scan and analyze the UI to update the API. Some user intervention may be performed to confirm that the key-values pairs identified by the API are correct. Alternatively, limited user intervention is performed by manually marking the key-value pairs on the UI for creation of the API, for example, by marking rectangles around each key-value pair on the UI.

In an exemplary implementation, the systems, methods, and/or code instructions described herein are used to quickly and efficiently integrate a legacy UI of an emergency operations center (e.g., 911 response service, public-safety answering point (PSAP)) with code (e.g., application) that converts an analogue call into a smart-call, for example, as described with reference to U.S. patent application Ser. No. 15/822,927 (hereinafter the '927 application), filed Nov. 27, 2017, by common inventors and assigned to the same assignee as the present application. In other words, in an exemplary implementation, the systems, methods, and/or code instructions described herein are used for converting analogue calls received by a PSAP into smart calls. The integration is done, for example, by installing the integration code on the computing device hosting the legacy UI. The API is automatically generated based on a UI presented on a screen of an emergency operations center (e.g., PSAP), for example, a 911 response service. The phone number of each incoming caller is presented on the UI, optionally in proximity to the label "Caller number". The automatically generated API provides the current phone number of the current caller as the value of the key-value pair, and the label "Caller number" as the key of the key-value pair. The key-value pair(s) may be manually marked by an operator (e.g., drawing a rectangle around the key-value pairs) and/or the key-value pair(s) may be automatically detected, as described herein. The application, which optionally executes on the same computing device that executes the UI, accesses the API to obtain the current phone number. The application converts the analogue call originating from a smartphone (and/or other mobile device) associated with the current phone number (i.e., the analogue call is received by the emergency operations center (e.g., PSAP)) into a smart-call. The smart-call provides one or more multi-media data objects associated with the smart phone. The application injects the multi-media data objects back into the UI, for presentation on the display of the computing device. Effectively, the legacy UI of the emergency operations center that receives analogue phone calls is transformed into an upgraded smart UI by the injection of additional multi-media data objects obtained by the application according to the phone number, for example, a photo captured by a camera of the smartphone, a video streamed from a camera of the smartphone, an image shared by the smartphone, a message sent by a messaging application (e.g., chat, SMS) executed on the smartphone, and a geographic location indicating the location of the smartphone. The transformation of the legacy UI to the smart UI is performed simply, quickly, efficiency, with low risk of errors due to incorrect integration.

At least some implementations of systems, methods, and/or code instructions described herein relate to the technical problem of converting an analogue call (e.g., received by an emergency response center via a legacy API that displays the phone number of the caller, PSAP, into a smart call that upgrades the legacy UI to provide multi-media data objects from the smartphone of the caller without accessing the code of the UI and/or without involving third parties administering the UI. The update may include, for example, streaming video from a video camera of the smartphone, opening a chat window to enable chatting from the legacy UI to the screen of the smartphone, and providing real time location data of the smartphone on the legacy UI (e.g., via an indication on a map) that is optionally tracked in real time as the smartphone moves. The technical solution to the technical problem is provided, by at least some implementations of systems, methods, and/or code instructions described herein based on the API described herein that is dynamically updated based on dynamic data identified on the legacy UI, and/or based on the smart-call GUI described herein that is injected into the legacy UI.

At least some implementations of systems, methods, and/or code instructions described herein improve the technology of UIs, optionally legacy UI, for example, that receive analogue calls at an emergency response center (e.g., PSAP), by providing the smart-call GUI described herein which dynamically provides multi-media data objects from the smartphone of the analogue call received by the legacy UI. The smart-call GUI enables feeding of multi-media data objects from the smartphone into the legacy UI. The smart-call GUI may dynamically adjust position and/or size (e.g., expand and/or contract) in response to activation and/or termination of the multi-media data objects. The smart-call GUI may include markings (e.g., icons) for use by the user of the legacy UI (e.g., selected by clicking via the mouse cursor) for activation or termination of the multi-media data objects provided by the smartphone of the caller whose analogue call from the smartphone is received by the legacy GUI. The smart-call GUI provides control to the user of the legacy UI for activation of the multi-media data objects on the smartphone of the caller whose analogue call from the smartphone is received by the legacy GUI, without accessing the code of the legacy UI, without adjustment of the code of the legacy UI, and/or without interfacing with third parties administering the legacy UI. For example, the user of the legacy UI is able to activate a real time video feed from the camera of the smartphone which placed an analogue call that is received by the legacy UI.

As used herein, the term smartphone represents an exemplary implementation of a mobile device. The term smartphone may be interchanged with other mobile devices with similar capabilities, for example, a glasses computer, a watch computer, a wearable computer, a laptop, and a tablet computer.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term user interface (i.e., UI) may sometimes be interchanged with the term graphical user interface (i.e., GUI).

Figure 2:
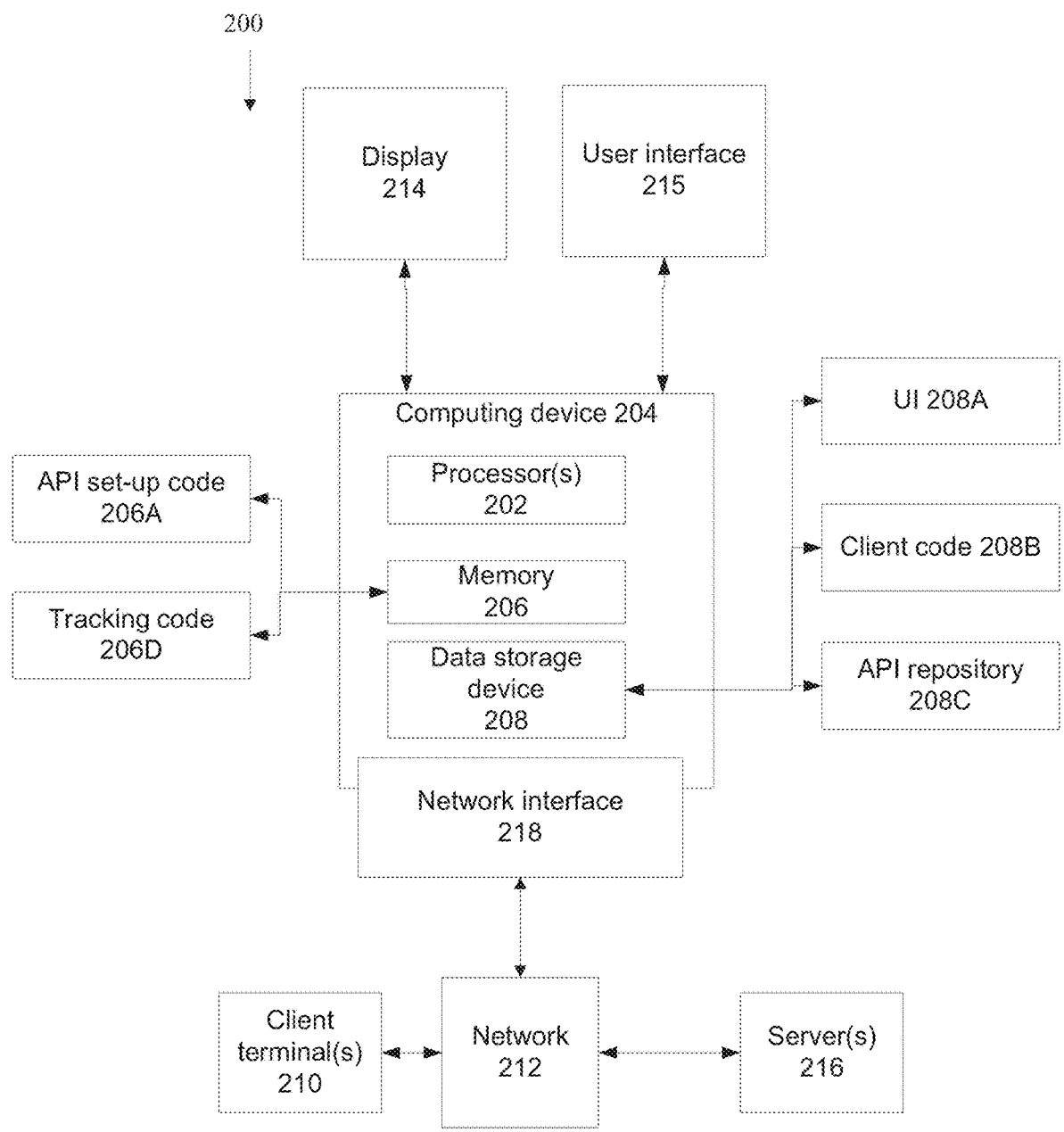
FIG. 2 is a block diagram of components of a system for automatically updating an API with a dynamic data stream according to dynamic values extracted from a UI, in accordance with some embodiments of the present invention.

Reference is now made to FIG. 1, which is a flowchart of a method for automatically updating an API with a dynamic data stream according to dynamic values extracted from a UI, in accordance with some embodiments of the present invention. Reference is also made to FIG. 2, which is a block diagram of components of a system 200 for automatically updating an API with a dynamic data stream according to dynamic values extracted from a UI, in accordance with some embodiments of the present invention.

System 200 may implement the acts of the method described with reference to FIG. 1, by processor(s) 202 of a computing device 204 executing code instructions 206A and/or 206D stored in a memory 206 (also referred to as a program store).

Computing device 204 may be implemented as, for example, a client terminal, a server, a virtual server, a computing cloud, a virtual machine, a desktop computer, a thin client, and/or a mobile device (e.g., a Smartphone, a Tablet computer, a laptop computer, a wearable computer, glasses computer, and a watch computer). In an example of an implementation, computing device 204 is implemented as a server of clients of an emergency response operations center, for example, a 911 call-in center, and/or PSAP.

Multiple architectures of system 200 based on computing device 204 may be implemented. For example:

Computing device 204 may be implemented as a standalone device (e.g., kiosk, client terminal, smartphone) and/or group of standalone devices (e.g., network, server connected to multiple clients) that include locally stored API set-up code instructions 206A that implement one or more of the acts described with reference to FIG. 1. Computing device 204 may store UI 208A, which is analyzed by API generation code 206 for automatic updating of the API based on key-value pair(s) of UI 208A, as described herein. The generated API(s) may be stored in an API repository 208C. Computing device 204 may store client code 208B that obtains the key-value pair(s) from the automatically generated API. For example, computing device 204 may store a legacy emergency call center UI (e.g., used in PSAP call centers) 208A, store an application for automatically converting analogue calls into smart-calls based on caller phone numbers extracted from the call center UI by the API, as described with reference to the '927 application, and store API set-up code 206A. In such an implementation, UI 208A, and client code 208B are stored in association with the same computing device, for example, to increase security by avoiding transmission of the automatically generated API over a network, and/or due to legalities involved with transmission of 911 call center data out of the computing device hosting the legacy UI.

The locally stored code instructions 206A may be obtained from another server, for example, by downloading the code over a network, and/or loading code 206A from a portable storage device.

Once code instructions 206A are stored on computing device 204, the API is automatically updated without necessarily communicating with an external server.

UI 208A may be presented on a display 214 of computing device 204, and/or UI 208A may be presented on a display of one or more client terminals 210 that access computing device 204 over a network 212, for example, via a web browser and/or acting as thin clients of a server (e.g., in a 911 call-in center).

Client code 208B may reside on client terminals 210 and/or server(s) 216. Client code 208B may access one or more automatically generated APIs stored by computing device in API repository 208C, over network 212. In such an implementation, computing device 204 provides APIs generated from an analysis of UI 208A to remotely located client terminal(s) 210 and/or server(s) 216 over network 212.

UI 208A is stored on client terminals 210 and/or server(s) 216. The analysis of the UI to generate the API is performed by code 206A stored on computing device 204. For example, screen captures of UI 208A stored on client terminals 210 and/or server(s) 216 are performed by locally installed code (e.g., which may be obtained from computing device 204) and transmitted to computing device 204 over network 212. Code 206A stored on computing device 204 analyzes the UI (e.g., the screen captures) to automatically generate the API. The automatically generated API may be stored locally by computing device (e.g., in API 208C) and/or transmitted back to the respective client terminals 210 and/or server(s) 216 and/or transmitted to another computing device, over network 212. In such an implementation, computing device 204 provides the service of automatic updating of APIs based on UIs to remotely located client terminals and/or servers.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 when executed by hardware processor(s) 202.

Computing device 204 may include data storage device 208 for storing data, for example, UI 208A based on which the API(s) is automatically updated, client code 208B that accesses the automatically updated API, and/or API repository 208C that stores the automatically updated API(s). Data storage device 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 (and/or client terminal(s) 210 and/or server(s) 216) include and/or are in communication with one or more displays 214 for presenting UI 208A based on which the API(s) is automatically updated.

Computing device 204 (and/or client terminal(s) 210 and/or server(s) 216) include and/or are in communication with one or more physical user interfaces 215 that include a mechanism for a user to interact with the UI. Exemplary physical user interfaces 214 include, for example, a touchscreen, a gesture activation device, a keyboard, a mouse, and voice activated software using speakers and microphone.

Referring now back to FIG. 1, acts 102, 104A-C, 106, and 108 represent a set-up process for designation of the key-value pair(s) and updating of the API. Acts 102 and 104A-C represent a detection of tracked object portion of the set-up process. Acts 106 and 108 represent a definition of the dynamic data stream and definition of the API portion of the set-up process. Multiple APIs may be defined for one or more UIs, where each API stores one or more key-value pairs identified from a respective UI, for example, one or more APIs per UI. The APIs may be stored in the API repository. Each API may be stored in association with a profile, which may include, for example, an indication of the UI from which the API derives the key-value pair(s), and an indication of the key-value pair(s) provided by the API. Acts 110-114 represent a dynamic update process, in which the API is dynamically updated according to dynamically updated value(s) of the key-value pair(s) based on monitored changes of the UI. It is noted that act 108 may be included as both part of the set-up process (i.e., providing the initially created API) and as part of the dynamic update process (i.e., updating the dynamic data stream of the API). Acts 116-120 represent a utilization of the API dynamic data stream by the client code, and optionally a feedback process in which a graphical overlay of the UI is updated according to the client code and/or visual elements are injected into the UI according to the client code.

Acts 102-108 may be implemented by processor(s) 202 of computing device 204 executing API set-up code 206A. One or more manual interventions may be performed by a user, for example, manual designation of one or more key-value pairs (e.g., selection of a region on the UI as described herein), manual designation of a key of the key-value pairs (e.g., manual entry of the key when a region on the UI presenting the value is selected), manual editing of the automatically identified key-value pairs, and/or manual editing of the automatically created API. The manual interventions may be performed, for example, as a check of the automatic API creation process, and/or as manual additional to the automatic API creation process, and/or a replacement to the automatic API creation process. The API creation process as described with reference to acts 102-106 may be a full automatic process, a semi-automatic process with some manual intervention, or a fully manual process.

Acts 110-112 may be implemented by processor(s) 202 of computing device 204 executing tracking code 206D. It is noted that act 108 may be executed by code 206A and/or 206D. Acts 116-120 may be implemented by client code 208B, which may be executed by computing device 204 and/or client terminal 210 and/or server 216.

In an exemplary implementation, it is noted that the key-value pairs may be identified according to the UI, for example, automatically as described with reference to act 104A, manually as described with reference to act 104B, and/or based on an analysis of the hierarchical structure of the UI as described with reference to act 104C. Alternatively, for example, in the case of a single identified dynamic value or group of predefined values, the key of the key-value pair(s) may be set to NULL, or not provided. The identified dynamic value(s) may not necessarily be provided with any label, since the type (i.e., key) of the dynamic value(s) are known. For example, the dynamic value is known to be a phone number, and is processed as a phone number by the client terminal without necessarily requiring defining the corresponding key. In such cases, the term key-value pair as used herein may be interchanged with the term value or dynamic value. Alternatively, in another example, the client code that accesses the dynamic data stream via the API analyzes the value to determine the key of the key-value pair(s). The API may only provide values. The client code may analyze to determine, for example, whether the value is a phone number, an address, a geographic location, or other types. The key may be automatically assigned to the value. The key may be dynamically assigned to each value to create corresponding key-value pairs. For example, from the same value field of the API, a first value is determined by the client code to represent a phone number, and the first key-value pair is created defining key as phone number and assigning the value of the phone number to the value. A second value is determined by the client code to represent a geographic location, and the second key-value pair is created defining the key as location and assigning the value of the location to the value.

At 102, a UI is presented on a display of a computing device. The same UI may be displayed on different displays of network connected devices, for example, each terminal of an emergency response call in center (e.g., handling incoming 911 calls, PSAP) presents the same UI, with different data according to the respecting call being handled by the respective operator.

The UI may include a graphical user interface (GUI) that includes graphical objects, for example, graphical icons, video, images, banners, and/or text. The text presented within the GUI may be presented as one or more fonts and/or as images, optionally with different effects, for example, italics, bold, angles of rotation, and/or other effects.

The UI may include a predominantly textual based interface, for example, based on legacy systems.

Features 104A-104C depict different exemplary processes for analyzing the UI to identify one or more key-value pairs. The format of the key-value pairs may based on, for example, one of more of: Integer, String, Float, Color Type, Status Type, Binary value, options in a drop down menu, event types, selected from a redefined list of possibilities, or combination of the aforementioned. The key and the value may be of different types, for example, the key may be of type string, for example, "Caller phone number", or "ANI", and the value may be of type integer, for example, "2123215555".

At 104A, the visual presentation of the UI on the display is analyzed to identify the key-value pair(s). The image presented on the display, which includes the UI, may be analyzed. Optionally, the display that includes the UI is captured by a screen capture feature, for example, by executing the screen capture feature provided by the operating system. The screen capture may be stored as an image file. Alternatively or additionally, the values of the pixels of the display are analyzed.

Optionally, an optical character recognition (OCR) feature is executed on the visual presentation of the UI to identify text (e.g., numbers, letters, symbols, characters), for example, the image of the captured screen is processed by executing an OCR process to identify text. The text is analyzed to identify the key-value pairs.

The key-value pairs may be identified by textual terms which are placed in proximity to one another. For example, two terms close together within a threshold are designated as key-value pairs, for example, separated by 1-5 white spaces, or a certain number of pixels within a range, and/or within a certain distance on the screen.

Optionally, the determination of the key and the value of each pair is performed by determining which value remains static over a time interval, and which value changes over the time interval. The static value is designated as the key, and the dynamic value is designated as the value of the key-value pair.

The identification of the key and value of each pair may be performed by monitoring the display on which the UI is presented over a time interval. The UI presented on the display is monitored multiple times over the time interval, optionally at a preset rate, for example, 10 times per second, once per second, once per 5 seconds, or other values. The rate may be set, for example, manually selected by an administrator, obtained from a storage device storing predefined system parameters, and/or automatically set according to dynamic changes occurring in the UI to a rate that captures the changes occurring in the UI. Optionally, a sequence of screens is captured (e.g., by executing the screen capture process). The sequence of multiple screens (e.g., screen capture images) are analyzed to identify value(s) that dynamically change(s) over the time interval and/or to identify value(s) that remains static during the time interval. Optionally, each dynamically changing value is paired with the value(s) that remains static according to a proximity location between the respective dynamically changing value and the respective static value. For each identified key-value pair, each respective static value is designated as the key of the respective key-value pair, and each corresponding dynamically changing value located in proximity the static value is designated as the value of the respective key-value pair.

It is noted that the value of the key-value pair may include multiple values, stored for example, as a vector, array, and/or string. For example, the address of a current caller may include multiple terms such as the house number, apartment number, street address, and/or other values, which may be stored as a single value of the key-value pair. The entire address may be stored as a single string, and/or may be stored as a single record having multiple fields corresponding to different components of the address.

Optionally, a user (e.g., an administrator installing and/or setting up the code for automatic updating of the API) may manually adjust the automatically identified key-value pair(s). Region(s) of the UI corresponding to each respective automatically identified key-value pair may be marked on the display, for example, by an outline the encompasses each key-value pair (e.g., rectangle, optionally colored with a unique color relative to the background UI), with an arrow pointing to each key-value pair, and/or a unique color cording of the key-value pair (e.g., relative to the background of the UI). The user may be presented with another interface (e.g., GUI) for example, for confirming one or more of the automatically identified key-value pair, adapting one or more of the automatically identified key-value pair (e.g., adjusting which is the key and/or which is the value), cancelling one or more of the automatically identified key-value pair (e.g., removing the key-value pair from further processing), and/or manually adding one or more additional key-value pairs (e.g., as described with reference to act 104B).

Alternatively or additionally, at 104B, the user (e.g., an administrator installing and/or setting up the code for automatic updating of the API) manually designates each key-value pair, by manually marking region(s) of the UI. Each marked region may include one key-value pair. Marking may be performed, for example, by creating an outline around each key-value pair, for example, by creating a rectangle, circle, or freeform shape on the UI that encompasses each respective key-value pair. The region(s) may be manually marked on the UI by a user drawing a rectangle as an overlay over the UI, for example, via a marking GUI that provides the user with tools for designating the regions of the UI. The marking GUI may be presented as an overlay over the UI.

Each dynamic region, from which the key-value pair is obtained, is created with a single marking act. Each single marking act may be performed to define each region. For example, the marking of the region using a rectangle, and/or drawing a boundary around the region is considered as a single marking act.

The marking GUI may provide a user with features for designating the regions of the UI that include the key-value pairs, for example, an icon that well selected presents a rectangular drawing tool that provides the user with the feature of drawing rectangles over the UI (e.g., as an overlay), where each rectangle is expected to include one or more key-value pairs.

The text (e.g., numbers, letters, symbols, characters) may be extracted from the user marked region(s) based on OCR processing.

Optionally, each manually marked region is analyzed to identify the respective key and the corresponding value of the marked region that includes the respective key-value pair, for example, as described with reference to act 104A.

The key-value pair of each respective marked region of the UI may be identified by: monitoring the respective marked region over a time interval to identify a dynamic value that dynamically changes over the time interval and a static value that remains static over the time interval. The key of the key-value pair is designated according to the static value, and the value of the key-value pair is designated according to the dynamic value.

Alternatively or additionally, the user may manually designate the key and the value of each respective key-value pair, for example, by clicking on sub-regions of the each text term and selecting from a pop-up menu, by manually marking each key and each value using different shapes and/or after different prompts from the GUI that provides the user with tools for designating regions of the UI.

Alternatively or additionally, the user many manually enter the key and mark the region of the UI that presents the value of the corresponding key. For example, the user may manually enter the key as "LABEL-1", or "ANI", and manually mark a region on the UI that displays phone numbers. The value may be automatically identified within the marked region, for example, by OCR processing. The manually entered key is paired with the value identified within the marking to create the key-value pair. The pairing may be manually defined by the user and/or automatically inferred when the user follows instructions to first enter the key and then mark the region of the UI that includes the value.

Alternatively or additionally, at 104C the structure and/or layout of the UI is analyzed to identify the key-value pair(s). For example, the code (e.g., HTML code) may be analyzed, and/or the hierarchical arrangement of the UI elements within the UI is analyzed.

Optionally, the code of the UI is analyzed by walking a tree representation of the code of the UI. The tree representation may be created based on an analysis of the UI, optionally according to a hierarchical structural representation of the UI, where relatively smaller UI elements located within relatively larger UI elements are depicted as branches and/or lower down on the tree relative to the larger UI elements depicted higher up on the tree (i.e., relative to the root which is at the top of the tree). The tree is walked to identify the smallest text (e.g., numbers, letters, symbols, characters) box input object(s). The value of the respective key-value pair is designated according to the value stored by the respective smallest text box input object, which may be a variable for manual entry by a user and/or for being dynamically provided by another process. The key of the respective key-value pair is designated according to the key of the respective smallest text box input object, which may be a static value of the smallest text input box.

At 106, a dynamic data stream is defined based on the identified key-value pair(s). The dynamic data stream provides real time values of the value component of the identified key-value pairs, which are obtained by real time monitoring of the UI as described herein (e.g., with reference to act 110). Dynamic changes to the dynamic value of the UI are detected, and the dynamic data stream is automatically updated in real time to reflect the dynamic changes occurring in the presented dynamic value of the UI.

At 108, the dynamic data stream is provided to an API. The API is made available for access by client code.

The API may be automatically created, manually defined, and/or created by a semi-automatic process.

The API may be automatically created by code according to the identified key-value pairs, where the value of each key component of each respective key-value pairs is inserted into the API, and a field storing the value of the value component of each respective key-value pair is inserted into the API in association with the corresponding key component. The field(s) storing the value of each value component may define the dynamic data stream, that is dynamically updated based on extraction of monitored dynamic values presented in the UI, as described herein.

The API may be created by selecting a template from a set of different templates. The template may be selected according to the identified key-value pairs. For example, different templates are defined according to different numbers of key-value pairs, and/or different combinations of data types. The template may include generic fields that are modified according to the key(s) of the key-value pair(s), and/or generic data type fields that are modified according to the data types of the key-value pair(s).

The API may be manually defined (e.g., by a programmer), and/or an existing template may be manually adjusted.

In some implementations, a single API is created, where the single API includes a dynamic data stream that incorporates all of the identified key-value pair(s). In other implementations, multiple APIs are created, where each API includes one or more dynamic data streams based on the identified key-value pair(s). Each API may include a respective dynamic data stream based on a unique key-value pair(s) (i.e., each key-value pair is provided by one data stream of one API). Alternatively, key-value pair(s) may overlap between different dynamic data streams of different APIs (i.e., a certain key-value pair is provided by two or more dynamic data streams of respective APIs), optionally in different combinations.

The API may include an object class storing the key-value pair(s). Optionally, the object class is implemented as a JSON object storing the key-value pair(s) in human readable text format.

It is noted that the API is created without necessarily requiring access to the UI itself, such as source code of the UI and/or other files of the UI (e.g., library files). The code of the UI is not necessarily adjusted.

At 108, the dynamic data stream is provided to the API, for access by the client code. The API may be provided by the API set-up code (i.e., when the API is initially generated) and/or by the tracking code (i.e., when the API is dynamically updated). The API may be accessed, for example, by client code locally stored on the same computing device as the API, and/or accessed over a network by client code stored on a remote server.

The client code may include instructions for accessing and/or using the data stored by the API.

The API may be provided based on a selected serialization format, for example, JSON, XML, binary, or others.

The API may be provided by the tracking code to client code executing as another process on the same computing device, and/or the client code may be executing on the client terminal and/or the server, in which case the API is provided over the network. In such implementations, in which the client code is a process distinct from the tracking code, the API may be implemented as, for example, a Web API (e.g., HTTP), and/or based on remote method invocation (RMI) and/or other inter-process communication (IPC) formats.

The API may be provided by tracking code to client code which is executing within process common to the tracking code and the client code. In such implementations, the API may be provided without inter-process communication. IN such implementations, the API may be provided for example, based on a Classes API, and/or callback functions based upon identification of an event.

At 110, the UI presented on the display is monitored to detect dynamic updates of the key-value pair(s). The value component of the key-value pair(s) represents a dynamic value that is presented on the UI and monitored for changes. Optionally, designated regions of the UI that include the key-value pair(s) are monitored, rather than monitoring of the entire UI. Monitoring the designated regions may improve computational performance of the computing device that performs the monitoring, since for example, the data externally to the designated regions is irrelevant to the API. In another example, the data external to the designated regions may be entirely or mostly static over time. Saving the analysis of such data that remains static may prevent otherwise unnecessarily use of computational resources, since processing such data is expected to produce irrelevant results and/or unchanging results. Alternatively, the entire UI is analyzed, including irrelevant regions. Alternatively, changes between successive screen captures are identified and analyzed. For example, two successive screen captures are subtracted to compute the changing values.

At 112, respective values of key-value pair(s) of the data stream of the API are dynamically updated according to the detected dynamic updates.

Optionally, an API event is generated in response to each detected dynamic update. A new data object may be created according the value of the respective key-value pair corresponding to the respective detected dynamic update. Alternatively or additionally, the data stream outputs the dynamically updated values without necessarily generating the API event.

At 114, one or more features described with reference to acts 110-112 are iterated. The dynamic data stream of the API is automatically updated according to changes detected by monitoring of the UI, optionally by monitoring of regions of the UI corresponding to the location of the key-value pairs. API events may be generated in response to each dynamic updated. The client code is provided with the dynamic updates of the API according to the generated API events. In this manner, the client code is dynamically provided, in real time, with the current value(s) of each key-value pair.

Optionally, at 116, the client code computes one or more data objects according to key-value pair(s) of the API. The data objects may include, for example, visual elements (e.g., image(s), video(s), text), and/or the key-value pair(s) are used to obtain additional remote data such as location data (e.g., geographical location) and/or chat messages.

Optionally, the client code fuses data obtained from the API with data objects originating from the mobile device to create a fused data stream that may be forwarded to a remote client terminal. The client code may be executing on the mobile device, on a server hosting the legacy UI and/or on another computing device in communication with the mobile device and/or the server hosting the legacy UI. For example, the value of the key-value pair may include a phone number of a mobile device (e.g., caller calling into the emergency operations center). Voice data of an analogue telephone call originating from the mobile device (e.g., received by a server of the emergency operations center) is dynamically provided to the API for access by the client code. The client code fuses the voice data obtained from the API with data obtained from the mobile device, optionally with a video feed obtained from a video camera of the mobile device, to create a fused data feed. The fused data feed is transmitted to a remote computing device, optionally associated with emergency responders, for example, to a laptop in an ambulance, a smartphone of a police officer and/or a mobile device of a fire fighter. The fused data feed may be directly transmitted from the mobile device to the remote computing device, and/or forwarded by the server of the emergency response center to the remote computing device. Additional examples are described herein, for example, with reference to FIG. 4. It is noted that such cases described with reference to FIG. 4 be implemented with reference to act 116 of FIG. 1.

At 118, the computed data object is injected into the UI for presentation on the display of the computing device. The computed data objected may be provided to an additional layer, optionally an additional GUI, that is presented over the UI on the display. The additional GUI may enhance the UI with the presentation of the data objects, which are computed based on the key-value pair(s) presented by the UI.

As used herein, the term injected into the UI may refer to injection of the data object into the UI (e.g., into the code of the UI) and/or to presentation of the data object within the UI (e.g., as an overlay of the UI, and/or within another GUI presented over the UI).

The data object maybe injected into the UI, for example, by injecting data format into the UI. For example, the UI tree may be walked to identify the structure of the UI elements of the UI. One or more of the UI elements may be manipulated by injecting the data object therein, for example, via the operating system (OS) API.

Optionally, the computed data object (e.g., multi-media data objects and/or client data objects, as described herein) is injected into the UI via a smart GUI (e.g., the smart-call GUI described herein). The smart GUI is dynamically adjusted in real time to accommodate dynamic changes to the computed data object(s). Optionally, the smart GUI may include two or more states which are selected and presented according to the availability of the dynamic data stream and/or according to the availability of the computed data object. Optionally, the smart GUI dynamically expands or contracts according to the availability of the dynamic data stream and/or according to the availability of the computed data object. The expansion and contraction reduces the amount of area occupied on the legacy UI by the smart GUI, such that the smart GUI is sized to accommodate the actual available data, rather than being at a fixed size regardless of the available data. For example, the smart GUI may be presented on the legacy UI in a first inactive state, when no values are provided by the dynamic data stream, and/or when no computed data objects are provided. The smart GUI dynamically expands to accommodate addition computed data objects as such data objects are provided, optionally in response to the available dynamic data stream. The smart GUI dynamically expands and contracts according to the number and/or type of provided computed data objects. For example, as a streaming video is provided, the smart GUI expands to accommodate the streaming video. The smart GUI further expands to accommodate a chat session that is provided after the video. When the video is terminated, the smart GUI contracts to present the legacy UI underneath the video, rather than leaving a blank region for the video. Alternatively to expansion and contraction, the smart GUI may select from different available template GUIs (and/or dynamically compute such GUIs) to accommodate the real time computed data objects. Dynamic changes in the size and/or type and/or number of computed data objects may trigger a reselection o another template GUI.

Optionally, the smart GUI includes activation marking(s) for triggering activation of one or more of the computed data objects and/or termination markings for termination of one or more of the computed data objects. For example, the smart GUI may include icons, links, and/or a list for selection. When the user of the UI clicks on respective icons, computed data objects corresponding to the respective icons are activated and dynamically injected into the smart GUI. The smart GUI dynamically expands to accommodate the dynamically added computed data objects. When the user of the UI clicks the respective icons again (or clicks another marking indicating closure), the computed data objects corresponding to the closure indication are terminated and removed from the smart GUI. The smart GUI contracts in response to the terminated computed data object.

The location of the smart GUI relative to the legacy UI may be dynamically adjusted. The location of the smart GUI may be determined according to static regions of the legacy UI (e.g., as described in additional detail with reference to FIG. 4), and according to the current size of the smart GUI. When the smart GUI needs to expand to accommodate additional computed data objects but expansion will overlay dynamic data of the UI, the location of the smart GUI may be reselected to accommodate the expanded smart GUI. Alternatively or additionally, the smart GUI may be split into two or more sub-smart GUIs, or divided sub-smart GUIs may be recombined into a single smart GUI, according to dynamic changes of the computed data objects.

At 120, one or more acts 106-118 are iterated. The iterations provide a dynamic update of the data object(s) by the client code according to dynamically updates of the value of the key-value pair(s) of the API. The computed data object(s) may be dynamically injected into the UI for dynamic updating of the presentation on the display of the computing device. The smart GUI presented on the legacy UI may be dynamically adjusted (e.g., expanded or contracted or repositioned) in response to real time changes to the number, size, and/or type of computed data object(s).

Figure 3A:
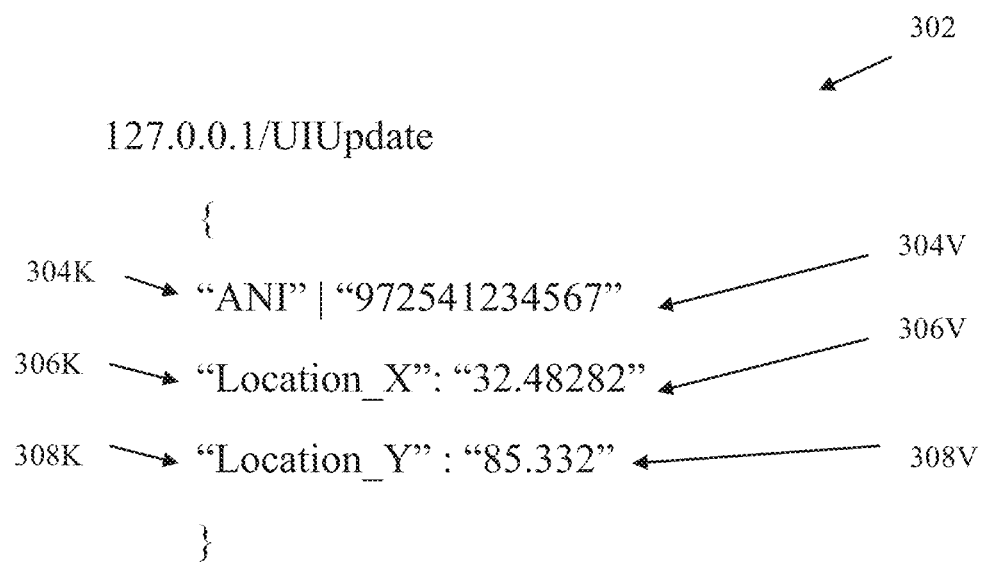
FIG. 3A is an example of a dynamic data stream of an API that is automatically updated according to monitored key-value pairs of the UI, in accordance with some embodiments of the present invention.

Reference is now made to FIG. 3A, which depicts an example of an API 302 that includes a data stream that is automatically updated according to monitored key-value pairs of the UI, in accordance with some embodiments of the present invention. API 302 may be defined based on the JavaScript Object Notation (JSON) format, or other data serialization formats, as described herein. API 302 may be automatically updated based on the UI, as described herein. API 302 may be updated according to a UI of a call-in center, for example, an emergency (e.g., 911, PSAP) call in center. API 302 includes the following keys, which may be automatically identified, as described herein: ANI (i.e., automatic number identification) 304K, Location_X 306K (i.e., geographical coordinates of the caller along a first, x, axis), and Location_Y 308K (i.e., geographical coordinates of the caller along a second, y, axis). The dynamic data stream may include the values 304V, 306V, and 308V, which are paired with corresponding keys 304K, 306K, and 308K, which are dynamically updated by monitoring the UI, as described herein. The values 304V, 306V, and 308V of the dynamic data stream of API 302 are dynamically updated according to the monitoring. The currently shown values for 304V, 306V, and 308V represent a snapshot in time, or a real time representation of the dynamic data stream. The values for 304V, 306V, and 308V are dynamically updated for each new caller, and the API is updated accordingly, storing the data according to the current caller.

Figure 3B:
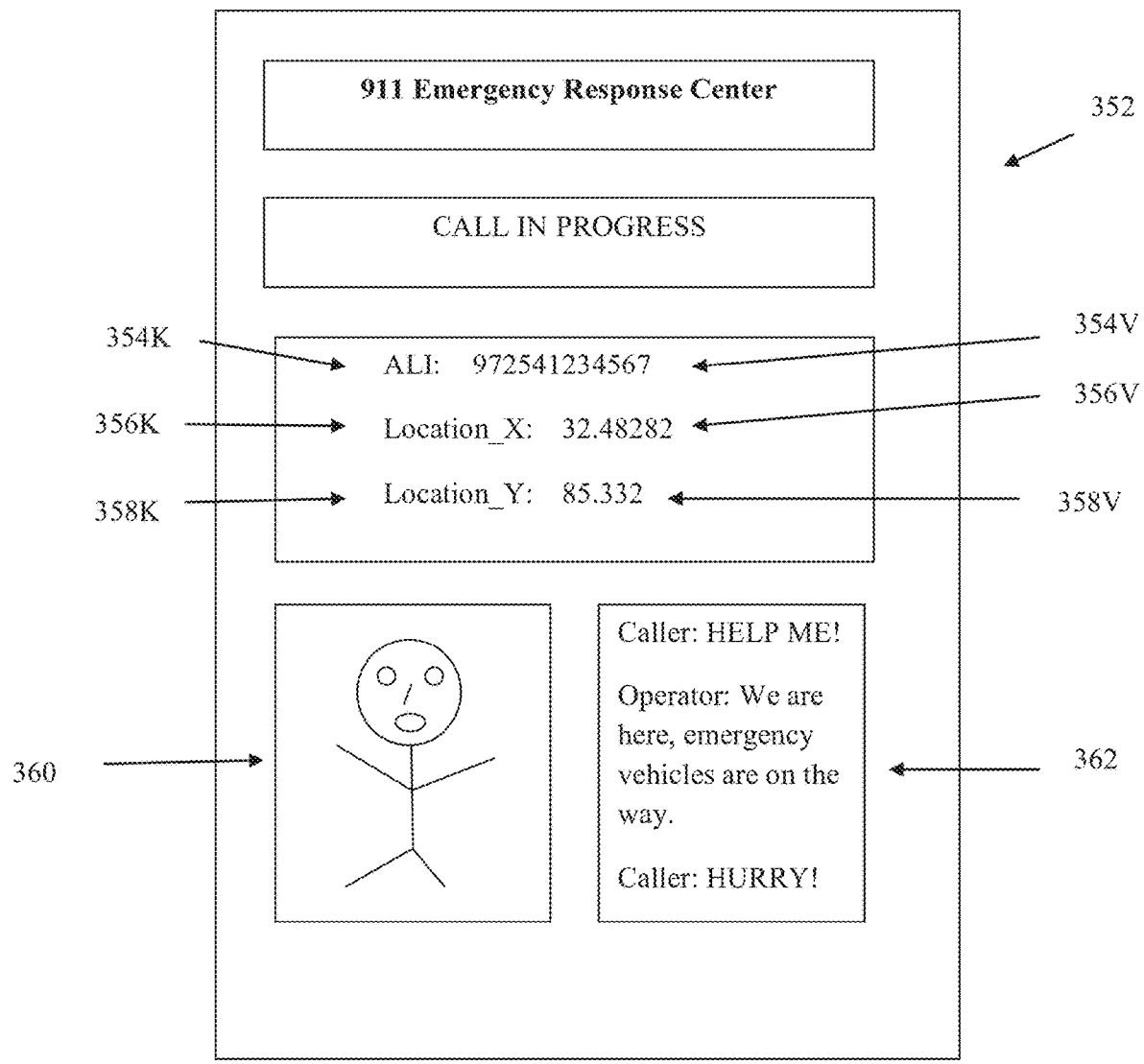
FIG. 3B is an example of the UI that is monitored for updating the dynamic data stream of the API of FIG. 3A.

Reference is now made to FIG. 3B, which is a schematic of a UI 352 that is monitored for dynamically updating the dynamic data stream of API 302 described with reference to FIG. 3A, in accordance with some embodiments of the present invention. UI 352 is, for example, a legacy UI of a 911 emergency response center, depicting a current call in progress. Legacy UI 352 presents a label ANI 354K, and a phone number of the current caller in ANI field 354V. Legacy UI 352 may present additional data, such as geographic coordinate labels 356K and 358K and corresponding values within geographic coordinate fields 356V and 358V (although it is noted that in legacy 911 systems the geographical coordinates may not be available, but may be provided by the smartphone of the caller via the client code, as described herein).

Labels 354K, 356K, 358K and associated values 354V, 356V, 358V may be identified as key-value pairs (e.g., as described herein with reference to acts 104A-C described with reference to FIG. 1), and extracted into corresponding keys 304K, 306K, 308K and associated values 304V, 306V, 308V of the key value pairs provided by API 302 described with reference to FIG. 3A (e.g., as described herein with reference to acts 106-108). The values of 354V, 356V, and 358V are monitored, dynamically extracted when changes are detected, and the dynamic data stream (i.e., values 304V, 306V, 308V) of API 302 is dynamically updated, as described herein, for example, with reference to acts 110-114.

Figure 4:
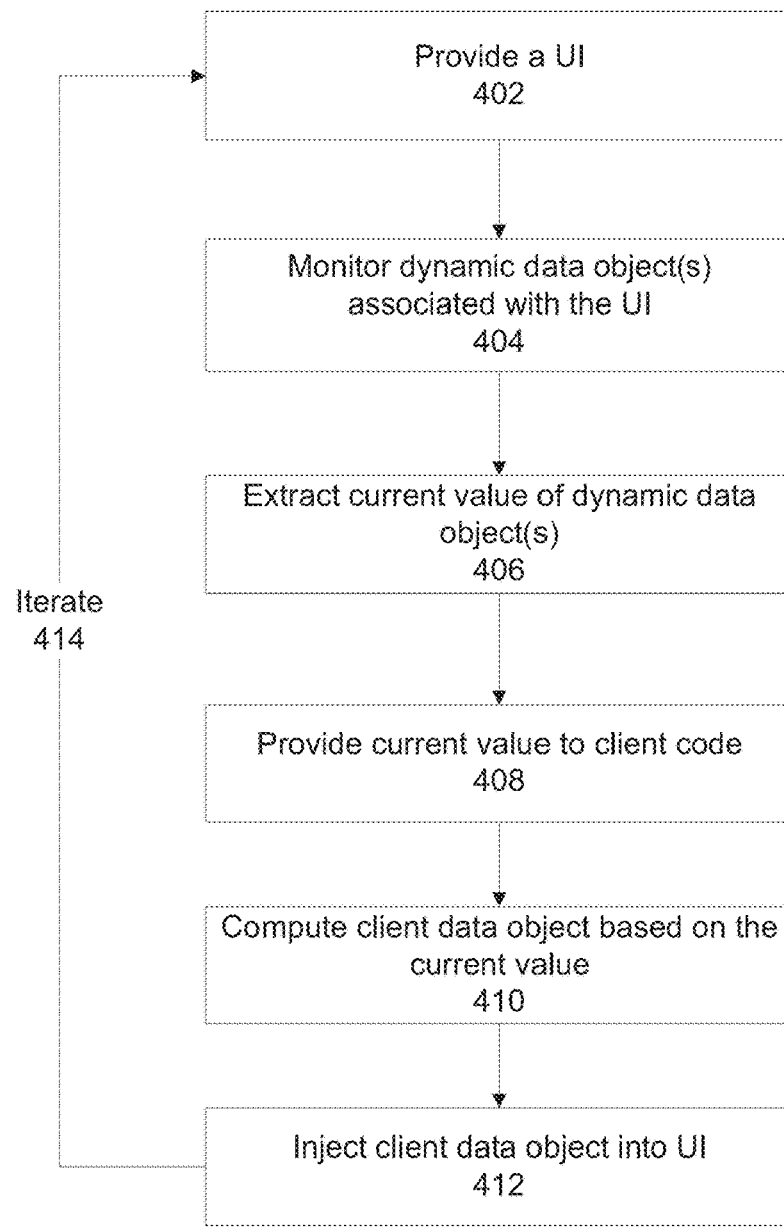
FIG. 4 is a flowchart of a method of dynamically updating a UI by injection of client data objects by client code, in accordance with some embodiments of the present invention.

Optionally, the client code, in response to accessing the dynamic data stream provided by API 302, injects multimedia data objects obtained from the smartphone of the caller into UI 352, as described herein, for example, with reference to acts 116-120 of FIG. 1 and/or FIG. 4. The client code, in response to the dynamically updated API 302 based on UI 352, transforms analogue calls received by legacy UI 352 into smart calls presented on UI 352. For example, a real time streaming video 360 recorded by a video camera of the smartphone of the caller, and/or a text based chat session 362 that provides two way communication between UI 352 and the smartphone of the caller, are injected into UI 352.

An exemplary implementation of the method described with reference to FIG. 1 and system 200 described with reference to FIG. 2 is now described, for converting analogue calls received by an emergency response center into smart calls, and/or for updating a legacy UI of an emergency response center (e.g., 911 call-in center) to convert analogue calls into smart calls, where the converting and/or the updating is performed without accessing the code of the legacy UI and/or without involving third parties associated with the UI. Additional details of the client code that converts analogue calls into smart calls according to a phone number of the caller may be found, for example, with reference to the '927 application.

The upgrade of the legacy UI may be performed quickly, for example in a matter of minutes, without necessarily involving adjustment of the code of the UI and/or involving developers of the UI.

At 102, the UI is provided. The emergency call center (e.g., PSAP) UI displays at least the ANI of the caller (i.e., the phone number). The call is received as an analogue call, even when the call originates from a smartphone. The UI may be executed by, for example, a server of the emergency call center to which multiple client terminals are connected, where each client terminal presents an instance of the UI that presents data of the current caller being answered by the respective operator of the client terminal.

At 104A-C, the UI is analyzed to identify the key-value pair which includes the ANI as key, and the current phone number of the caller as the value.

At 106, the dynamic data stream is defined based on the identified key-value pair.

At 108, the dynamic data stream is fed into an API, which is provided for access by the client code. The API may be created, for example, as described herein. Optionally, the client code (which receives a phone number of an analogue call as input and converts the analogue call to a smart call) and the UI are executed on the same computing device.

At 110, the UI is monitored to detect changes to the value, i.e., a new phone number.

At 112, the dynamic data stream of the API is updated to include the new phone number.

At 114, the dynamic data stream of the API is dynamically updated with new phone numbers as new calls are received by the emergency call center.

At 116, the client code converts an analogue call from a smartphone associated with the phone number into a smart-call. The conversion is performed based on the phone number of the caller, as discussed with detail to the '927 application. The client code computes one or more multi-media data objects. The multi-media data objects may be based on a multi-media communication application executing on the smartphone, and/or the multi-media data object may be obtained from another server based on the phone number. Exemplary multi-media data objects include: a photo captured by a camera of the smartphone, a video streamed from a camera of the smartphone (e.g., via webrtc API), an image shared by the smartphone, and a message sent by a messaging application executed on the smartphone (e.g., chat application, short, short message service (SMS) application), a geographic location indicating the location of the smartphone, and one way voice transmitted from the smartphone.

The transmission of the one way voice and/or text messages (e.g., SMS, chat) may be especially important, for example, during hostage taking and/or home violence situations when the caller requires help but is unable to call for help and/or unable to speak. In such a case, the user may use the smartphone to send a text to the emergency call center. The text may be detected, and the call converted from analogue to the smart-call.

Voice, optionally one-way voice, may be transmitted from the smartphone for example, via webrtc API, to a gateway of the computing device (e.g., server of the emergency response center). The gateway may SIP Trunk (and/or other technology based on voice over internet protocol (VoIP)) the call directly to the target PSAP so that the operator that takes the call is able to hear the caller even when the caller is unable to make a standard bidirectional phone call.

Briefly, the '927 application relates to a method and/or system for streaming real-time data from a user device to a call center. The method includes identifying a first connection between a user device and a call center, such as a PSAP for reporting on an emergency or non-emergency incident. The reporting may be a call initiated between the call center and use device. Both the user device and the call center are identified, and a link, such as a uniform resource locator (URL), that includes an identifier unique to the user device is sent to the user device. Upon identification that the link was engaged, the user device is configured to initiate the uploading of streaming real-time data from the user device to the call center. In an embodiment, the uploaded real-time data is associated with the user device using the identifier. The uploading of data may be accomplished by a preinstalled application, or an instant application, on the user device, as explained herein. The real-time data may be forwarded to a first dispatch unit terminal (DUT). According to optional embodiment, the first DUT receives the real-time data and associates the received data with at least an audio content received over the first connection.

In an embodiment, a server (e.g., the computing device described herein and/or other server) is configured to detect the establishment or an attempted establishment of a first connection through an application programming interface (API) of a private branch exchange (PBX) of the call center. Through the API, the server can search for an established (or queued) connection, and identify user devices (UDs, for example, smartphones) connected to the call center. The identification of a UD may be based on its phone number or other unique parameters associated with the UD.

Upon identification of the UD and the call center and/or the DUT, the server is configured to send an electronic message to the 130 over a second connection over the network. The second connection is directly established between the server and a UD over the network. The electronic message may be, for example, a short message service (SMS), an MMS, an electronic mail (email) message, and the like. The electronic message includes at least a link that includes an identifier unique to the UD. The identifier may be, for example, a code snippet, a randomly generated string, a signature, and so on. Each identifier is uniquely generated for each UD and therefore distinguishes any data sent from different UDs. The link may be, for example, a URL where the unique identifier may be the suffix of the URL, referencing a web address of the call center connected to the UD.

When the link has been engaged on the UD, e.g., selected, tapped, or clicked on, the server is configured to launch an application on the UD. In an embodiment, the application is a web browser, where the web browser includes an interface for uploading and/or streaming data. In this particular embodiment, the web browser is utilized to upload or stream real-time data collected by the UD.

In another embodiment, the link sent to the UD is configured to launch an instant application. Instant applications, such as Google® Android Instant Apps, allow users to run applications instantly, without requiring a user to download and install a full application file. The instant application enables the UD to rapidly open a designated application, such as an emergency application, and start uploading and/or streaming real-time data to the call center (referenced in the link) without requiring any specialized application to be installed on the UD beforehand. For example, when the link is engaged, only the necessary parts of an application's code are downloaded that enable the UD to rapidly stream real-time data. By using an instant application, significant and often critical time is saved, as an instant application can be downloaded and launched more quickly than a full application, thus allowing a UD to begin streaming the real-time data quickly.

Streaming the real-time data may be achieved using a Web Real-Time Communication (WebRTC) API that enables real-time communication over peer-to-peer connections. When initiating the web browser on the UD to stream data to the call center and/or to the DUT, the server may cause the UD to establish a WebRTC session using a WebRTC API that would allow streaming real-time data from the UD to the call center and/or the DUT. WebRTC protocol typically includes the ability to connect two devices without requiring an intermediate server, thereby allowing for data to stream directly without requiring an intermediate server.

Any real-time data streamed or otherwise uploaded to the call center is coupled with the unique identifier included in the link. In an embodiment where the real-time data is streamed to the call center, after the call center, e.g. a PSAP, receives the real-time data with the identifier, the call center routes the received real-time data to a DUT to which the UD was connected to through the first connection.

At 118, the multi-media data object(s) is injected into the UI for presentation on the display of the computing device. For example, the multi-media data object(s) is presented within another GUI presented as a layer over the UI. The UI, which is a legacy system that provides the phone number of the caller, is upgraded to include multi-media objects transmitted by the smartphone and/or based on the smartphone. The multi-media objects may aid in providing emergency assistance, for example, by providing silent communication between the caller and the emergency operations center (e.g., via text messages and/or one way voice), by providing images and/or video of the scene to the emergency operations center, and/or by tracking the real time location of the caller.

The presentation of the multi-media data object(s) may be dynamically updated. The dynamic updating of the presented multi-media data object(s) may be in response to streaming of data from the client code, for example, a video captured by a video camera of the smartphone is streamed and injected into the UI. In another example, the current location of the smartphone is tracked and dynamically updated. The presentation of the multi-media data object, for example, a map with an indication of the current location of the user, is updated to indicate the current location of the smartphone.

Optionally, a smart-call GUI presented as an overlay over the UI, and/or injected into the UI itself for presentation as another UI element within the UI. The smart-call GUI may be presented according to an inactive state when no value is assigned to the key-value pair, i.e., there is no current analogue call taking place that is associated with the UI. In the inactive state, the smart-call GUI may include one or more markings (e.g., icons) for activation of corresponding multi-media data objects, for example, an icon indicating activation of a video feed, an icon indicating a chat session, and an icon indicating real time geographic location tracking. When the user of the legacy UI clicks on one or more of the markings, the smart-call GUI may be presented according to an active state that presents the activated multi-media data objects within the smart-call GUI. The smart-call GUI may expand to include additional multi-media data objects, as the additional multi-media data objects are available. For example, the smart-call GUI may display a window showing a video being streamed from the smartphone. A second window may appear within the smart-call GUI when the user of the smartphone enters a text message via a chat application and/or SMS application. A third window may appear within the smart-call GUI when the location of the smartphone is determined. A map and an indication (e.g., tag) of the location of the smartphone may appear within the third window for tracking the location of the smartphone as the user moves. Markings on the smart-call GUI may be used to close and/or terminate existing multi-media data objects. For example, re-clicking on the video icon and/or clicking an X marking on the top right corner of the video terminates the video. The smart-call GUI may contract in response to the removed video to accommodate any remaining multi-media data objects.

Optionally, the size and/or location of the smart-call GUI is dynamically adjusted according to the number and/or type and/or size of the multi-media data objects, as described herein, for example, the smart-call GUI expands to accommodate additional multi-media data objects, and/or contracts when existing multi-media data objects are terminated.

Reference is now made to FIG. 4, which is a flowchart of a method of dynamically updating a UI by injection of client data objects by client code, in accordance with some embodiments of the present invention. The method described with reference to FIG. 4 may enhance dynamic data of a legacy UI, for example, a UI of an emergency call center that receives incoming analogue phone calls originating from a smartphone is enhanced with the ability to present multi-media data objects originating from multi-media applications executing on the smartphone, for example, a video captured by a video camera of the smartphone is streamed and presented within the legacy UI.

One or more features of the method described with reference to FIG. 4 may be integrated with and/or substitute with one or more features described with reference to FIG. 1. The method described with reference to FIG. 4 may be implemented by components of system 200 described with reference to FIG. 2.

At 402, a UI is provided, optionally a legacy UI, for example, of an emergency call center. The UI may be provided, for example, as described herein with reference to act 102 of FIG. 1.

At 404, a dynamic data object(s) associated with the UI is monitored to detect a change thereof.

The dynamic data object may include data objects presented on the UI, for example, text, and/or images.

The dynamic data object may include data objects outputted by the computing device which are associated with the UI, but not necessarily presented on the display, for example, streaming data of the received audio call for the caller whose data (e.g., phone number, ANI) is presented on the UI.

The dynamic data object may be indicative of user interactions with the UI and/or with the injected client data object, for example, coordinates of the mouse on the UI, an indication of where on the UI the user clicked, and/or coordinates of where a user touched a touch screen presenting the UI.

The dynamic data object may include the key-value pair(s) described herein.

Monitoring may be performed, for example, by analyzing changes between captured images of the screen (e.g., as described herein), detection of generated events (e.g., outputs of processes that monitor the position of the cursor on the screen), and/or other methods.

Monitoring may be performed, for example, as describe with reference to acts 104A-C, 110, and/or 112 of FIG. 1.

At 406, the current value of the dynamic data object is extracted in report to the detected change. The extraction may be trigged by events (e.g., detection of a change), performed at predefined intervals (e.g., every 10 seconds, or every minute), and/or continuously performed and/or at intervals approximating continuity (e.g., to stream an audio call, and/or to stream the locations of the mouse as the user navigates across the screen).

The value may be extracted from the UI itself (e.g., based on OCR as described herein), and/or extracted from other sources (e.g., from the process controlling the microphone, from the process controlling input of a mouse).

At 408, the current value is provided to the client code, for example, via the dynamic data stream of the API, as described herein (e.g., with reference to acts 106-108). The current value may be integrated with the dynamic data stream, for example, location data of the mouse may be included as a key-value pair.

At 410, the client data object is computed by the client code based on the current value of the dynamic data object. For example, as described with reference to act 116.

Exemplary client data objects may include the multi-media data objects described herein, and/or other data, for example, biometric data outputted by biometric sensors monitoring the caller and/or monitoring other people that are transmitted to the smartphone of the caller, for example, blood pressure, and pulse.

In one example, the dynamic data object includes streaming voice of an analogue telephone call received by an emergency response center, originating from a smartphone. The phone number of the smartphone is presented on the UI of the server of the emergency response center. The client data object is computed by using the streaming voice call with one or more multi-media data streams outputted by a multi-media communication application executed by the smartphone, for example, the voice call is fused with a video feed outputted by a video camera of the smartphone. The fused data feed, which is provided to the server of the emergency response center, may be forwarded to another computing device, for example, a laptop within an ambulance, a smartphone of a police officer, and/or glasses computer of a firefighter, to provide real time voice and video originating from the smartphone to the emergency services crew located on-site and/or travelling to the site. It is noted that the fusion may be performed by another client code executing on the server, that receives the video feed from the smartphone and fuses the video feed with the audio call. In both cases the fusion is performed without accessing and/or modifying the code of the legacy UI and/or without interacting with third parties that administer the legacy UI.

In another example, the dynamic data object includes streaming voice of an analogue telephone call received by an emergency response center, originating from a smartphone. The phone number of the smartphone is presented on the UI of the server of the emergency response center. The client data object is computed by executing a natural language processing (NLP) code for analyzing key words identified in the streaming voice data. For example, the client data object may include a text transcription of the voice call, and/or one or more predefined key words identified from voice call (e.g., "Terrorist attack", "Car accident", "Heart attack"). The key words and/or transcription may be injected into the UI. In a next iteration, the user interaction with the injected client data object is monitored to determine whether the user selected the injected client data object. Another client data object may be injected into the UI in response to the user selection. For example, in response to "Terrorist Attack", an icon to say "Call for backup" may be presented. When the user clicks on the icon, terrorist attack messages are transmitted to backup forces. In another example, in response to selecting "Heart Attack", a list of first responder instructions are injected into the UI, to be read by the operator to the caller.

At 412, the client data object is injected into the UI. For example, as described with reference to act 118.

Optionally, the client data object is injected into one or more static regions of the UI. The static regions of the UI may be identified by analyzing the UI over a time interval according to regions of the UI that remain constant over the time interval. The location within the UI into which the client data object is injected may vary over time, as different static regions are identified. For example, a new value appearing in an existing static region triggers moving of the injected client data object into another static region.

At 414, one or more acts 402-412 are iterated. For example, as described with reference to act 120. It is noted that in act 402, the previously presented UI is updated by the injection of the client data object.

In a next iteration, the user interaction with the previously injected client data object is monitored to determine whether the user selected the previously injected client data object. Another client data object may be currently injected into the UI in response to the user selection of the previously injected client data object.

Reference is now made to FIGS. 5A-F, which are schematics of an exemplary smart-GUI injected into a legacy UI, in accordance with some embodiments of the present invention. The exemplary smart-GUI depicts the case of a smart-call GUI for injection into a legacy system of an emergency response center, for example, a PSAP, for transforming analogue calls received by the PSAP into smart-calls, as described herein.

Figure 5A:
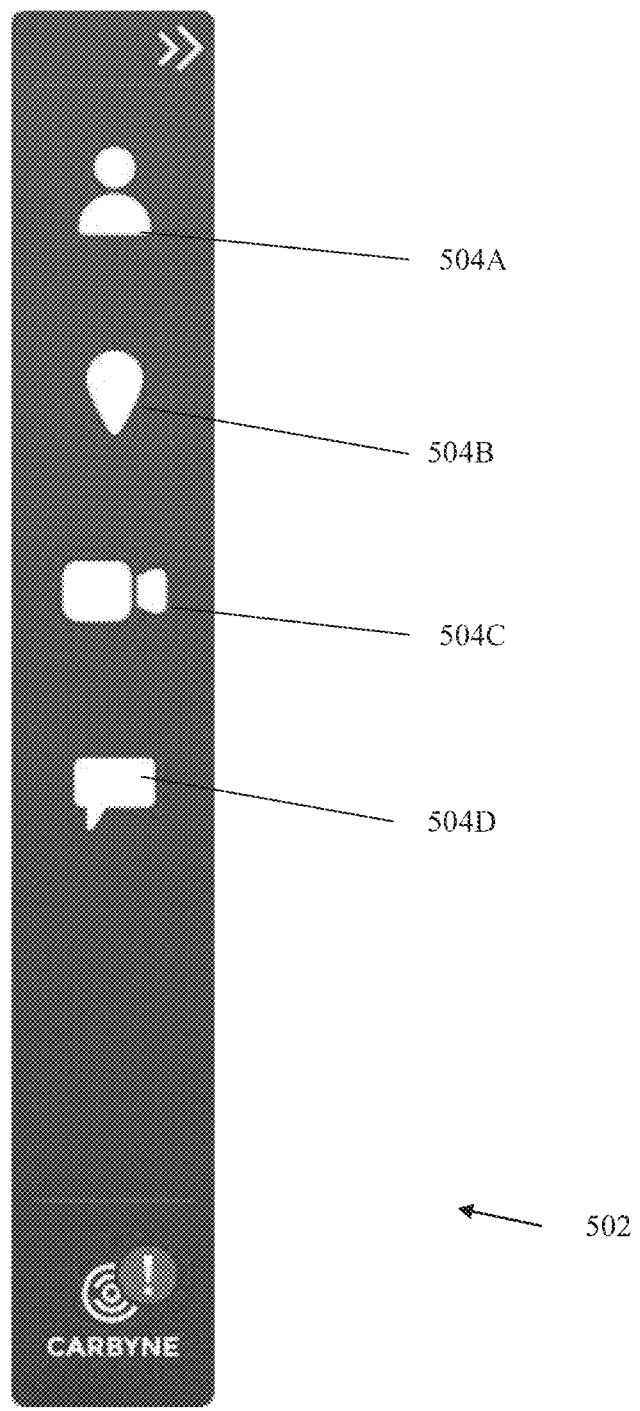
FIGS. 5A-F are schematics of an exemplary smart-GUI injected into a legacy UI, in accordance with some embodiments of the present invention.

FIG. 5A depicts smart-call GUI 502 in an inactive state, as described herein. For clarity, the underlying PSAP is not shown, however, as described herein, smart-call GUI 502 is injected into and/or overlayed on the legacy UI, for example, on static regions of the legacy UI. Smart-call GUI 502 includes icons 504A-D for activation of corresponding multi-media data objects on the smartphone of the caller, as described herein. For example, the user of the legacy UI may click on icon 504A to obtain the phone number of the smartphone of the caller, click on icon 504B to obtain a real time location of the smartphone presented on a map that is dynamically tracked and updated, icon 504C to activate a real time video feed from a camera of the smartphone, and icon 504D to start a two way text chat session with the smartphone.

Figure 5B:
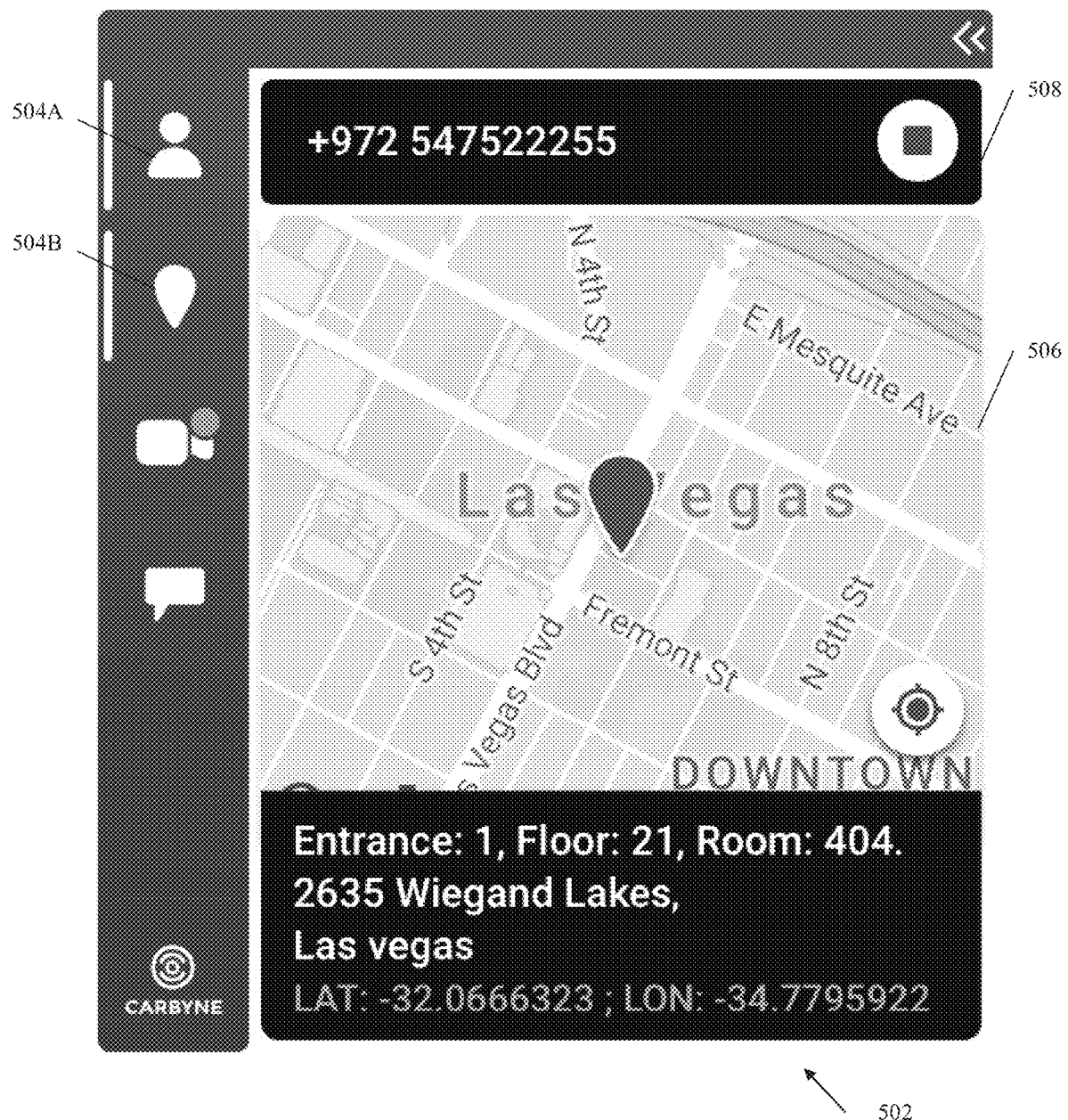

FIG. 5B depicts smart-call GUI 502 in an active state, as described herein. Smart-call GUI 502 is expanded to include a multi-media data object presenting real time location (i.e., of the smartphone whose analogue call is being handled by the legacy UI) indication on a map 506, optionally presented in response to selection of icon 504B. Smart-call GUI 502 may be expanded to include the phone number of the caller within another data object 508, optionally presented in response to selection of icon 504A.

Figure 5C:
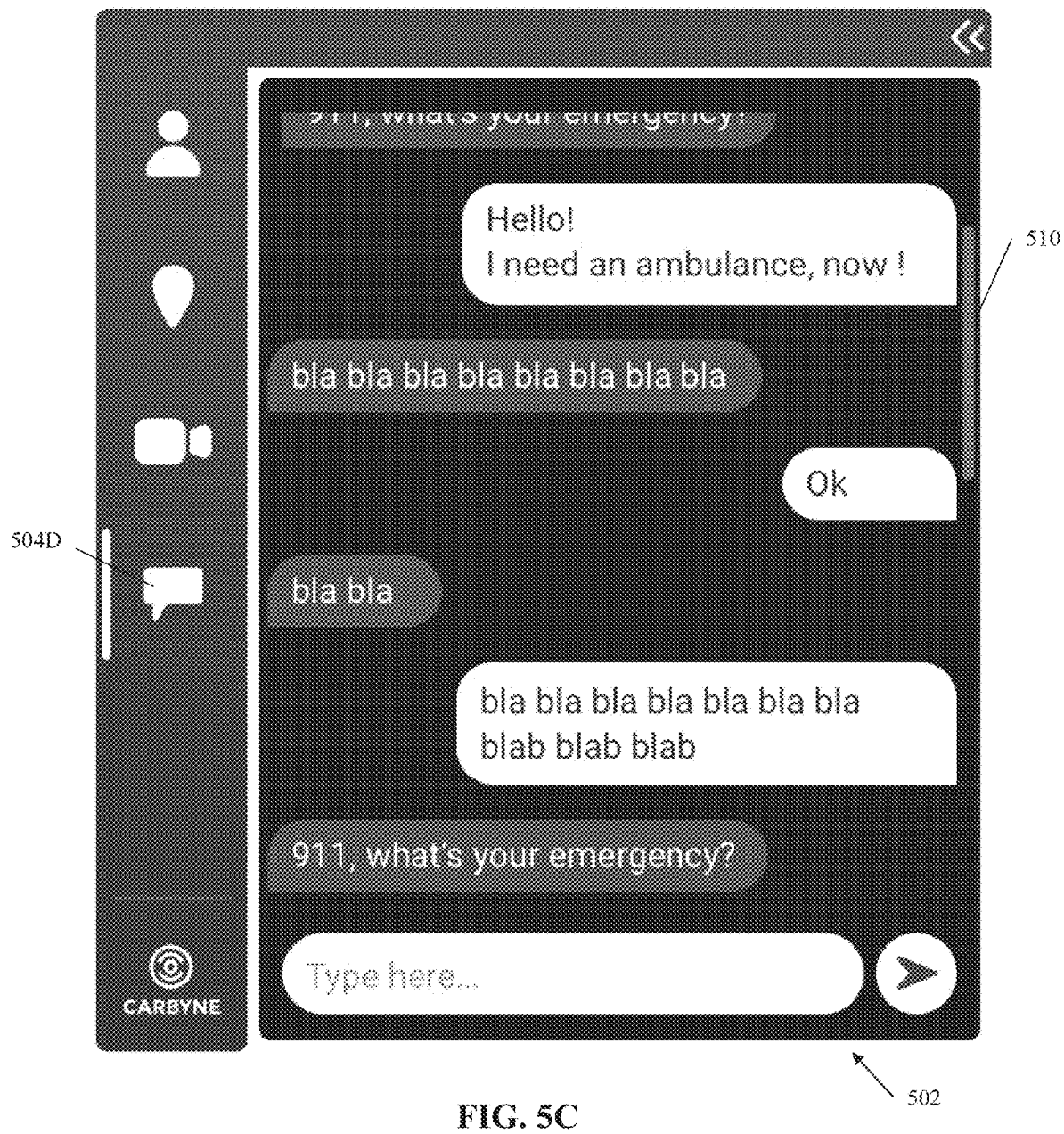

FIG. 5C depicts smart-call GUI 502 in an active state, where smart-call GUI 502 is expanded for presenting a text chat session 510 between the legacy UI and the smartphone whose analogue call is being handled by the legacy UI, optionally presented in response to selection of icon 504D.

Figure 5D:
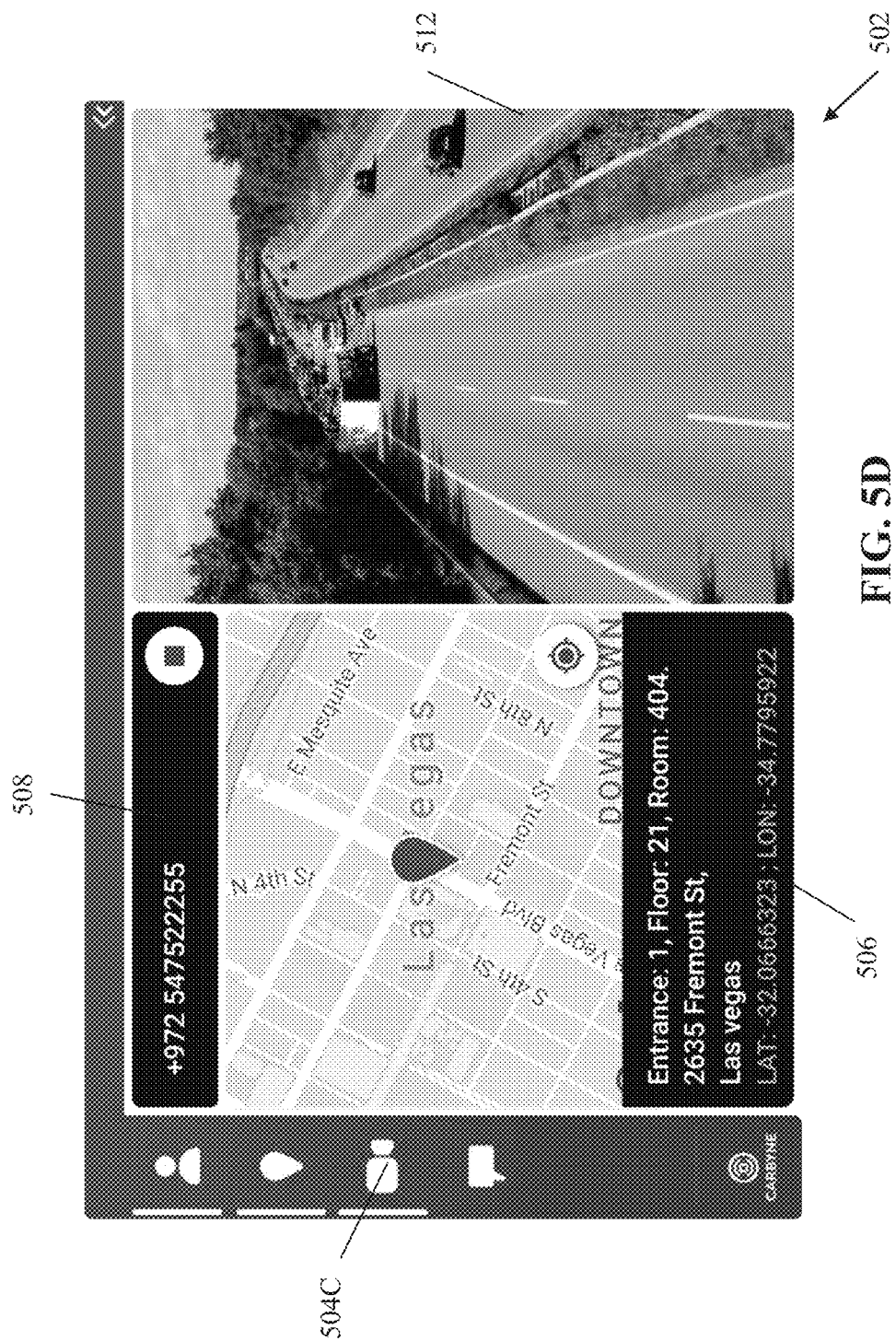

FIG. 5D depicts smart-call GUI 502 in an active state, where smart-call GUI 502 is expanded from the state depicted in FIG. 5B to include a real time video feed 512 from a video camera of the smartphone whose analogue call is being handled by the legacy UI, optionally presented in response to selection of icon 504C.

Figure 5E:
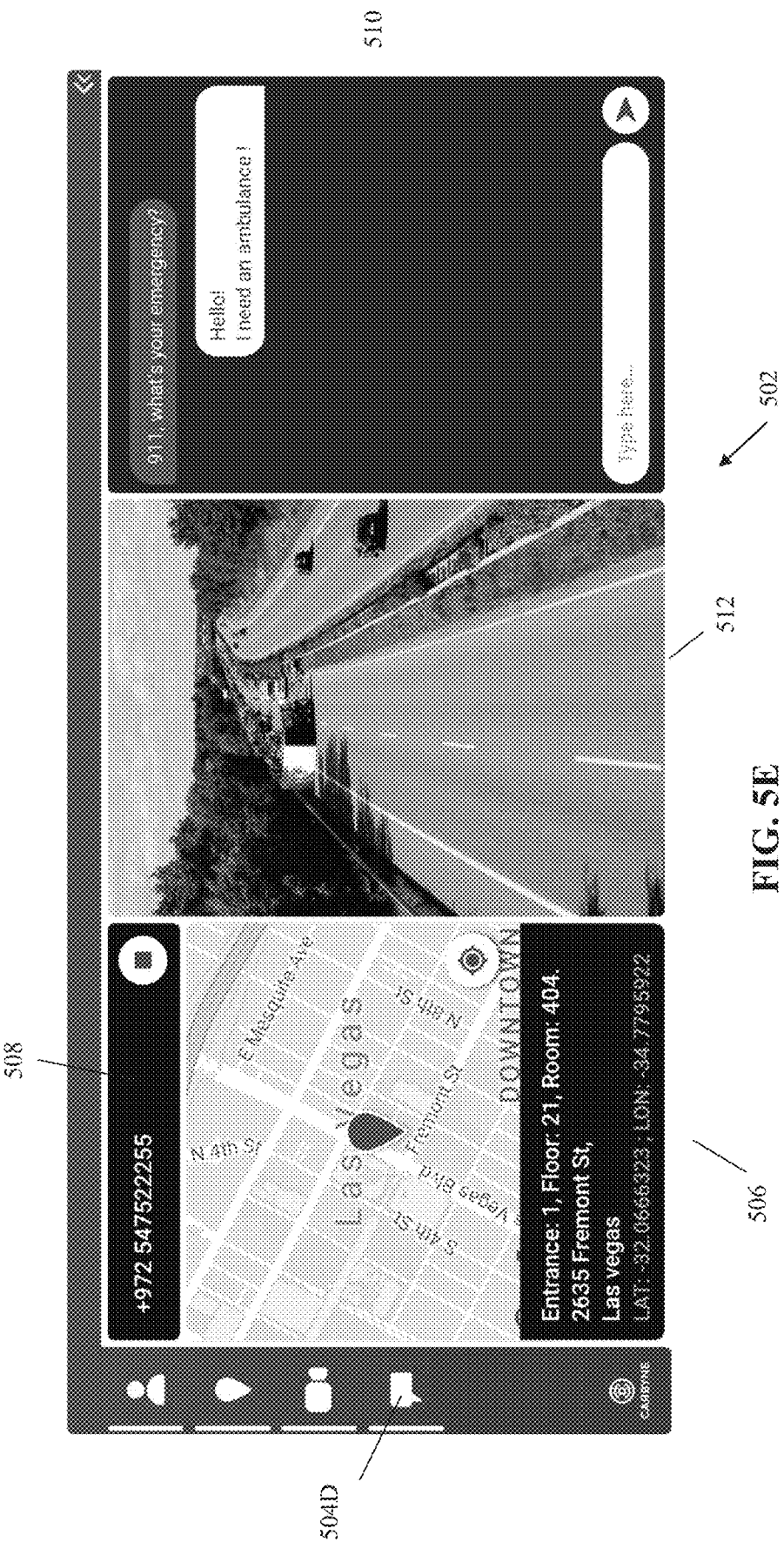

FIG. 5E depicts smart-call GUI 502 in an active state, where smart-call GUI 502 is further expanded from the state depicted in FIG. 5D to include the text chat session 510 described with reference to FIG. 5C, optionally presented in response to selection of icon 504D.

Figure 5F:
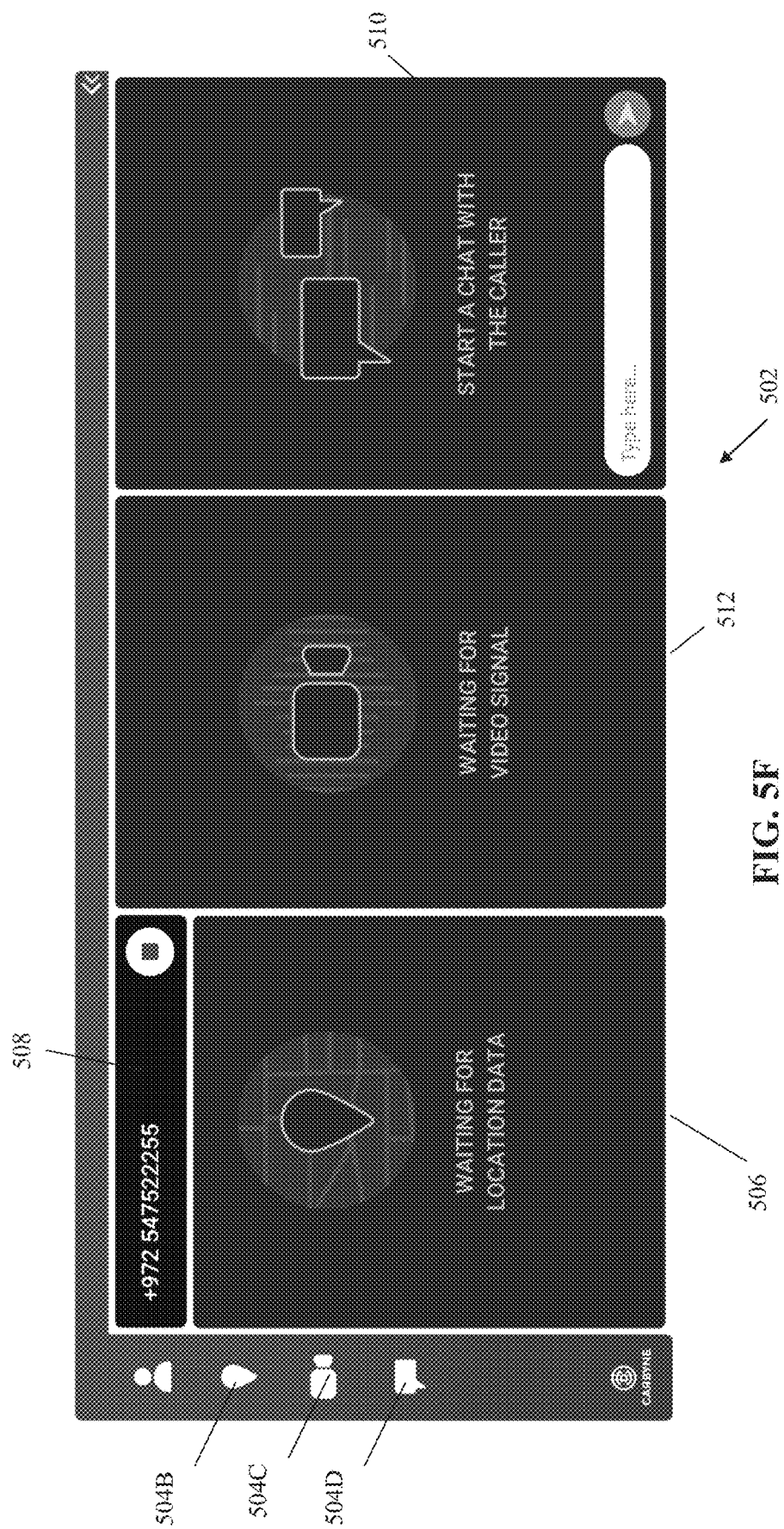

FIG. 5F depicts smart-call GUI 502 in an active state, where the user of the legacy licked on icons 504B-D to activate the location data 506, the video feed 512, and the chat session 510, and is waiting for the smartphone to provide the data. Optionally, when the data is not provided by the smartphone, for example, after a threshold time limit has passed, the smart-call GUI 502 may enter the inactive state and/or retract back to the state shown in FIG. 5A. Optionally, when some data is provided by other data is not provided, for example for one or two out of the three windows 506 512 510, smart-call GUI 502 retracts accordingly to fit the one or two windows, for example, as shown in FIG. 5B, 5C, or 5D.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant UIs and APIs will be developed and the scope of the terms UI and API are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for automatically updating an application programming interface (API) according to a user interface (UI), comprising: monitoring a visual presentation of a UI presented on a display of a call center computing device, by capturing a plurality of time sequential images of a screen of the on the display;

analyzing the visual presentation the UI on the display using image processing executed on the plurality of time sequential images, to identify at least one dynamic data object included in the presentation of the UI on the display and to identify a plurality of dynamic updates of at least one key-value pair of data elements presented within the dynamic data object, wherein the at least one key-value pair of data elements comprises a static part of the pair and a dynamic part of the pair which changes over time, and defines at least one of a caller phone number and unique device identifier of a call-in to the call center placed by a caller;

for each of the plurality of dynamic updates detect one of a plurality of values of the dynamic part of the at least one key-value pair;

for each of the plurality of values:
generating a dynamic data stream comprising media data acquired from a user device of the caller, using the respective value of the at least one key-value pair, wherein the media data includes at least one member of a group consisting of: location information of the user device, a real time streaming video captured by the user device and a text based chat session conducted on the user device;

providing the dynamic data stream to an API for access by a client code executed by the call center computing device; and wherein the client code dynamically computes at least one data object according to the plurality of values, and the computed data object is dynamically injected into the UI for dynamic updating of the visual presentation of the UI on the display of the computing device.

2. The method of claim 1, wherein the API includes an object class storing the plurality of values the at least one key-value pair.

3. The method of claim 1, wherein the API is provided to the client code based on callback function.

4. The method of claim 1, wherein an API event is generated in response to each detected dynamic update from the plurality of dynamic updates, and a new data object is created according the respective value of the at least one key-value pair corresponding to the respective detected dynamic update.

5. The method of claim 1, wherein the UI comprises a graphical user interface (GUI) that includes graphical objects, and wherein analyzing comprises performing an optical character recognition (OCR) process of the GUI to identify the plurality of values of the at least one key-value pair.

6. The method of claim 1, wherein analyzing comprises analyzing a screen capture of the display presenting the UI by performing OCR to identify the plurality of values of the at least one key-value pair.

7. The method of claim 1, further comprising:
marking at least one region of the UI corresponding to each respective key-value pair; and
obtaining at least one of a confirmation and an adaption of at least one marked region from a user.

8. The method of claim 1, wherein the API includes only the respective value of the key-value pair, and the key of the key-value pair is not defined or determined by the client code according to an analysis of the value of the key-value pair.

9. The method of claim 1, wherein the client code computes at least one data object according to the at least one key-value pair of the API, and further comprising injecting the computed data object into the UI for presentation on the display of the computing device.

10. The method of claim 1, wherein the user device is a mobile device, wherein the media data further comprises voice data of an analogue telephone call originating from the mobile device, wherein the client code fuses the voice data obtained from the API with the real time streaming video obtained from a video camera of the mobile device to create a fused data feed.

11. The method of claim 1, wherein the client code converts an analogue call from a smartphone associated with the caller phone number into a smart-call, wherein the smart-call comprises at least one multi-media data object, and wherein the at least one multi-media data object is the media data and is injected into the UI for presentation on the display of the computing device, wherein the presentation of at least one multi-media data object is dynamically updated.

12. The method of claim 11, wherein the at least one multi-media data object is based on a multi-media communication application executing on the smartphone.

13. The method of claim 12, wherein the at least one multi-media data object is selected from the group consisting of: a photo captured by a camera of the smartphone, a video streamed from a camera of the smartphone, an image shared by the smartphone, a message sent by a messaging application executed on the smartphone, a geographic location indicating the location of the smartphone, and one way voice transmitted from the smartphone.

14. The method of claim 1, further comprising a smart-call GUI presented as an overlay over the UI, wherein the smart-call GUI is presented according to an inactive state when no value is assigned to the at least one key-value pair indicative of no current analogue call, and the smart-call GUI is presented according to an active state that presents at least one multi-media data object.

15. The method of claim 14, wherein the smart-call GUI of the inactive state includes at least one activation marking for activation of a corresponding multi-media data object, and the smart-call GUI of the active state includes at least one termination marking for termination of a corresponding multi-media data object, wherein the smart-call GUI dynamically expands in response to additional activated multi-media data objects and contracts in response to termination of existing multi-media data objects.

16. The method of claim 1, wherein the client code and the UI are executed on the same computing device.

17. The method of claim 1, wherein the call center computing device is a public-safety answering point (PSAP).

18. A computer implemented method for automatically updating an API according to a UI, comprising:
monitoring a visual presentation of a UI presented on a display of a call center computing device, by capturing a plurality of time sequential images of a screen of the UI on the display;
analyzing at least one of a structure and a layout of the visual presentation of the UI presented on the display using image processing executed on the plurality of time sequential images, to identify at least one dynamic data object included in the presentation of the UI on the display and to identify a plurality of dynamic updates of at least one key-value pair of data elements presented within a-the dynamic data object of the UI, wherein the at least one key-value pair of data elements comprises a static part of the pair and a dynamic pall of the pair which changes overtime, and defines at least one of a caller phone number and unique device identifier of a call-in to the call center placed by a caller;
for each of the plurality of dynamic updates detect one of a plurality of values of the dynamic part of the at least one key-value pair;
for each of the plurality of values:
generating a dynamic data stream comprising media data acquired from a user device of the caller, using the respective value of the at least one key-value pair, wherein the media data includes at least one member of a group consisting of: location information of the user device, a real time streaming video captured by the user device and a text based chat session conducted on the user device;
providing the dynamic data stream to an APE for access by a client code executed by the call center computing device; and
wherein the client code dynamically computes at least one data object according to the plurality of values, and the computed data object is dynamically injected into the UI for dynamic updating of the visual presentation of the UI on the display of the computing device.

19. The method according to claim 18, wherein the analyzing the code comprises: processing a tree representation of the code of the UI to identify at least one text box input object, wherein a value of a certain key-value pair is designated according to a value stored by a certain text box input object, and a key of the certain key-value pair is designated according to the key of the certain text box input object.

20. A computer implemented method for automatically updating an API according to a UI, comprising:
providing a UI presented on a display of a computing device;
providing a mechanism for a user to manually mark at least one region of the UI on the display;
analyzing each manually marked at least one region of the UI on the display, by capturing a plurality of time sequential images of a screen of the UI on the display and using image processing executed on the plurality of time sequential images, to identify at least one dynamic data object included in the at least one region and structured as at least one key-value pair;
analyzing a visual presentation of the least one key-value pair to identify a plurality of dynamic updates of the at least one key-value pair, wherein the at least one key-value pair comprises a static part of the pair and a dynamic part of the pair which changes over time, and defines at least one of a caller phone number and unique device identifier of a call-in placed to a call center by a caller;
for each of the plurality of dynamic updates detect one of a plurality of values of the dynamic part of the at least one key-value pair;
for each of the plurality of values:
generating a dynamic data stream comprising media data acquired from a user device of the caller, using the respective value of the at least one key-value pair, wherein the media data includes at least one member of a group consisting of: location information of the user device, a real time streaming video captured by the user device and a text based chat session conducted on the user device;
providing the dynamic data stream to an API for access by a client code executed by a call center computing device; and
wherein the client code dynamically computes at least one data object according to the plurality of values, and the computed data object is dynamically injected into the UI for dynamic updating of the visual presentation of the UI on the display of the computing device.

21. The method of claim 20, wherein each region is identified with a single marking act executed by the user via the mechanism.

22. The method of claim 20, wherein analyzing comprises receiving a manual entry by the user indicative of at least one key, wherein a certain key-value pair is identified by pairing each respective manually entered key with a corresponding value identified with a certain manually entered region, and wherein monitoring comprises monitoring each manually entered region of the UI to detect dynamic updates of each respective value of each respective key-value pair.

23. The method of claim 20, wherein the mechanism comprises a marking tool for drawing a geometrical shape defining the at least one region as an overlay of the UI.

24. The method of claim 20, wherein the key-value pair of each respective marked region of the UI is identified by:
monitoring the respective marked region over a time interval to identify a dynamic value that dynamically changes over the time interval;
receiving a manually entered value; and
designating the key of the key-value pair according to the manually entered value and the value of the key-value pair according to the dynamic value.

25. A computer implemented method for dynamically updating a UI, comprising:
monitoring a visual presentation of a UI presented on a display of a call center computing device, by capturing a plurality of time sequential images of a screen of the UI;
analyzing the visual presentation of the UI on the display, using image processing executed on the plurality of time sequential images, to identify at least one dynamic data object included in the presentation on the UI and to detect a change to the at least one dynamic data object, wherein the at least one dynamic data object defines at least one of a caller phone number and unique device identifier of a call-in to the call center placed by a caller;
dynamically extracting a current value of the at least one dynamic data object in response to the detected change;
dynamically providing the current value of the at least one dynamic data object to client code so as to allow the client code to acquire media data acquired from a user device of the caller, using the current value, wherein the media data includes at least one member of a group consisting of: location information of the user device, a real time streaming video captured by the user device and a text based chat session conducted on the user device;
dynamically computing at least one client data object that includes the media; and
dynamically injecting the at least one client data object for presentation of the media together with the UI on the display of the computing device.

26. The method of claim 25, wherein the at least one dynamic data object is indicative of an interactive user event of a user interacting with the at least one client data object.

27. The method of claim 25, wherein the at least one dynamic data object comprises streaming voice data of an analogue telephone call originating from a phone and received by the computing device, wherein the caller phone number is presented on the UI, wherein the client code executes a natural language processing (NLP) code for analyzing key words identified in the streaming voice data, and wherein the client data object is computed according to the analysis of the key words identified in the streaming voice data.

28. The method of claim 25, further comprising analyzing the UI over a time interval to identify at least one static region where the UI remains constant over the time interval, and wherein the at least one client data object is injected into the UI for presentation over the at least one static region.

29. The method of claim 25, wherein in a next iteration, user interactions with the previously injected client data object are monitored to determine whether the previously injected client data object is selected, wherein another client data object is computed according to the user interactions, and wherein the another client data object is currently injected into the UI in response to the user selection of the previously injected client data object.

* * * * *